(12) United States Patent
Takenaka et al.

(10) Patent No.: US 10,518,803 B2
(45) Date of Patent: Dec. 31, 2019

(54) WORK VEHICLE AND METHOD FOR CONTROLLING WORK VEHICLE

(71) Applicant: KOMATSU LTD., Tokyo (JP)

(72) Inventors: Yuita Takenaka, Tokyo (JP);
Masanobu Nakabayashi, Tokyo (JP);
Masanori Ikari, Tokyo (JP)

(73) Assignee: KOMATSU LTD., Tokyo (JP)

( * ) Notice: Subject to any disclaimer, the term of this patent is extended or adjusted under 35 U.S.C. 154(b) by 127 days.

(21) Appl. No.: 15/556,442

(22) PCT Filed: Oct. 26, 2016

(86) PCT No.: PCT/JP2016/081735
§ 371 (c)(1),
(2) Date: Sep. 7, 2017

(87) PCT Pub. No.: WO2017/073617
PCT Pub. Date: May 4, 2017

(65) Prior Publication Data
US 2018/0105205 A1    Apr. 19, 2018

(30) Foreign Application Priority Data
Oct. 30, 2015   (JP) ................... 2015-213870

(51) Int. Cl.
*B62D 6/02*     (2006.01)
*B62D 6/00*     (2006.01)
(Continued)

(52) U.S. Cl.
CPC ............. *B62D 6/008* (2013.01); *B62D 5/091* (2013.01); *B62D 5/20* (2013.01); *B62D 6/002* (2013.01);
(Continued)

(58) Field of Classification Search
CPC .......... B62D 6/008; B62D 1/12; B62D 5/006; B62D 5/091; B62D 5/20; B62D 6/002;
(Continued)

(56) References Cited

U.S. PATENT DOCUMENTS 5,195,798 A * 3/1993 Klein ................. B60J 1/1823
                                                   296/107.07
6,179,082 B1   1/2001 Ikari
(Continued)

FOREIGN PATENT DOCUMENTS

| CN | 101568460 A | 10/2009 |
| CN | 101959741 A | 1/2011 |

(Continued)

OTHER PUBLICATIONS

The Office Action for the corresponding Chinese application No. 201680013250.6, dated Jan. 3, 2019.
(Continued)

*Primary Examiner* — Jacob D Knutson
*Assistant Examiner* — Marlon A Arce
(74) *Attorney, Agent, or Firm* — Global IP Counselors, LLP

(57) ABSTRACT

An articulated work vehicle with linked front and rear frames includes a joystick lever, a hydraulic actuator, a control valve, a force imparting component, a joystick displacement sensor, a steering angle sensor, and a controller. The joystick lever is operated to allow a target steering angle to be set. The hydraulic actuator is driven hydraulically to change an actual steering angle. The control valve controls flow of fluid supplied to the hydraulic actuator to eliminate deviation between the target and actual steering angles. The force imparting component imparts an assist force or a counterforce to the operation of the joystick lever. The controller controls the force imparting component so (Continued)

that a counterforce is imparted to the operation of the joystick lever when the joystick lever has been operated in an opposite direction from a rotation direction of the front frame based on detections of the sensors.

14 Claims, 17 Drawing Sheets

(51) Int. Cl.
  *B62D 12/00* (2006.01)
  *B62D 5/09* (2006.01)
  *B62D 5/20* (2006.01)
  *B62D 6/08* (2006.01)
  *E02F 9/22* (2006.01)
  *E02F 9/08* (2006.01)

(52) U.S. Cl.
  CPC .................. *B62D 6/02* (2013.01); *B62D 6/08* (2013.01); *B62D 12/00* (2013.01); *E02F 9/225* (2013.01); *E02F 9/0841* (2013.01)

(58) Field of Classification Search
  CPC .. B62D 6/02; B62D 6/08; B62D 12/00; F02F 9/2004; F02F 9/225; G05G 5/03; E02F 9/0841
  See application file for complete search history.

(56) References Cited

U.S. PATENT DOCUMENTS

| | | | |
|---|---|---|---|
| 6,202,501 B1 | 3/2001 | Ikari | |
| 7,610,989 B2 * | 11/2009 | Vigholm | B62D 1/22 180/418 |
| 2008/0041655 A1 | 2/2008 | Breiner et al. | |
| 2008/0162000 A1 | 7/2008 | Dattilo et al. | |
| 2008/0315559 A1 * | 12/2008 | Murakami | A01B 67/00 280/446.1 |
| 2009/0218780 A1 * | 9/2009 | Mauz | B60G 3/20 280/124.109 |
| 2010/0263167 A1 * | 10/2010 | Fox | F16F 7/104 16/400 |
| 2010/0307857 A1 | 12/2010 | Shinagawa | |
| 2011/0029199 A1 | 2/2011 | Saito et al. | |
| 2012/0217083 A1 | 8/2012 | Brickner | |
| 2015/0210310 A1 | 7/2015 | Akatsuka et al. | |
| 2015/0298586 A1 * | 10/2015 | Rothstein | B60N 2/01516 297/378.12 |

FOREIGN PATENT DOCUMENTS

| | | |
|---|---|---|
| CN | 102530055 A | 7/2012 |
| CN | 104520167 A | 4/2015 |
| DE | 10 2012 107 595 A1 | 2/2014 |
| JP | 11-105723 A | 4/1999 |
| JP | 11-321664 A | 11/1999 |
| JP | 2008-296681 A | 12/2008 |
| JP | 2015-113039 A | 6/2015 |
| WO | 2009/130866 A1 | 10/2009 |

OTHER PUBLICATIONS

The extended European search report for the corresponding European application No. 16859846.4, dated Oct. 8, 2018.
The International Search Report for the corresponding international application No. PCT/JP2016/081735, dated Jan. 24, 2017.

* cited by examiner

WORK VEHICLE AND METHOD FOR CONTROLLING WORK VEHICLE

CROSS-REFERENCE TO RELATED APPLICATIONS

This application is a U.S. National stage application of International Application No. PCT/JP2016/081735, filed on Oct. 26, 2016. This U.S. National stage application claims priority under 35 U.S.C. § 119(a) to Japanese Patent Application No. 2015-213870, filed in Japan on Oct. 30, 2015, the entire contents of which are hereby incorporated herein by reference.

BACKGROUND

Field of the Invention

The present invention relates to a work vehicle and to a method for controlling a work vehicle.

Description of the Related Art

An articulated work vehicle has been disclosed with a configuration in which the steering angle is changed by controlling the flow of fluid supplied to a hydraulic actuator disposed from the front frame to the rear frame (see H11-105723 and Japanese Patent Laid-Open Patent Application 11-321664, for example).

The work vehicles in Japanese Laid-Open Patent Application H11-105723 and Japanese Patent Laid-Open Patent Application 11-321664 are provided with a steering valve that adjusts the flow of fluid supplied to a hydraulic actuator according to an inputted pilot pressure, and a pilot valve that adjusts the pilot pressure supplied to the steering valve.

The pilot valve is provided with an operation input shaft and a feedback input shaft that are able to rotate relative to each other. The operation input shaft is linked to the joystick lever and rotates according to the rotational angle of the joystick lever. The feedback input shaft is linked to the front frame by a linking mechanism. A change in the steering angle is transmitted to the feedback input shaft by the linking mechanism, causing the feedback input shaft to rotate. Consequently, the feedback input shaft rotates according to the steering angle. The pilot valve adjusts the pilot pressure inputted to the steering valve according to the difference between the rotational angle of the operation input shaft and the rotational angle of the feedback input shaft.

When the joystick lever is rotated one way, the operation input shaft of the pilot valve rotates according to the rotational angle. At this point, the steering angle has not yet been changed, and the rotational angle of the feedback input shaft is zero. Therefore, the pilot valve is opened at an aperture corresponding to the rotational angle of the operation input shaft, and supplies pilot pressure to the steering valve. The steering valve supplies fluid to the hydraulic actuator in an amount corresponding to the inputted pilot pressure. Consequently, the hydraulic actuator is driven and the steering angle is changed.

When the steering angle is changed to follow the rotation of the joystick lever as discussed above, the linking mechanism moves due to this change in the steering angle, and the movement of the linking mechanism is transmitted to the feedback input shaft. Here, when the steering angle matches the rotational angle of the joystick lever, the difference between the rotational angle of the operation input shaft and the rotational angle of the feedback input shaft drops to zero. Consequently, the pilot valve is in the neutral position, and the steering valve is also in the neutral position. Therefore, the steering angle stops changing, and the steering angle is maintained in a state of matching the rotational angle of the joystick lever.

Thus, the target steering angle is decided by the rotation of the joystick lever, the actual steering angle follows the target steering angle, and when the actual steering angle matches the target steering angle, the actual steering angle stops changing.

SUMMARY

With the work vehicles of the above-mentioned Japanese Laid-Open Patent Application H11-105723 and Japanese Patent Laid-Open Patent Application 11-321664, however, when the joystick lever is operated in the reverse direction before the actual steering angle of the vehicle body reaches the target steering angle, the left-right position of the pilot valve abruptly switches, and pilot pressure is supplied so as to actuate in the opposite direction from the rotation direction. Accordingly, fluid is suddenly supplied from the steering valve to the hydraulic actuator so as to actuate in the opposite direction from the rotation direction of the vehicle body, which may result in vibration in the vehicle body.

In light of the above problems encountered with conventional work vehicles, it is an object of the present invention to provide a work vehicle and a work vehicle control method with which vibration is less likely to occur when reverse operation is performed.

The work vehicle pertaining to the first aspect is an articulated work vehicle in which a front frame and a rear frame are linked, comprising a joystick lever, a hydraulic actuator, a control valve, a displacement sensor, an angle sensor, and a controller. The joystick lever is operated by an operator and allows a target steering angle to be set. The hydraulic actuator is driven hydraulically and changes the actual steering angle of the front frame with respect to the rear frame according to the operation of the joystick lever. The control valve controls the flow of fluid supplied to the hydraulic actuator so that there will be no deviation between the target steering angle and the actual steering angle, and is in a neutral position in a state in which the target steering angle matches the actual steering angle. The force imparting component imparts an assist force or a counterforce to the operation of the joystick lever. The displacement sensor senses displacement of the joystick lever. The angle sensor senses the actual steering angle. The controller controls the force imparting component so that a counterforce is imparted to the operation of the joystick lever when it is detected that the joystick lever has been operated in the opposite direction from the rotation direction of the front frame on the basis of what is sensed by the displacement sensor and the angle sensor.

Thus, when reverse operation is detected, a counterforce is imparted to the operation of the joystick lever. Therefore, the tactile sensation of the joystick lever during reverse operation becomes heavier, the sudden switching of the left and right positions of the control valve is slowed, and vibration of the vehicle body is less likely to occur.

The work pertaining to the second aspect is the work vehicle pertaining to the first aspect, wherein the controller controls the force imparting component so that a counterforce is imparted to the operation of the joystick lever before reaching the neutral position.

Thus, when reverse operation is detected, a counterforce is imparted to the operation of the joystick lever before the control valve reaching the neutral position. That is, a counterforce is generated against the operation of the joystick lever so as to prevent the control valve from going past the neutral position during the reverse operation.

Accordingly, as the neutral position is approached during reverse operation, the tactile sensation of the joystick lever becomes heavier, the sudden switching of the left and right positions of the control valve is slowed, and vibration of the vehicle body is less likely to occur.

The work vehicle pertaining to the third aspect is the work vehicle pertaining to the second aspect, wherein the controller actuates the force imparting component so that a counterforce is imparted to the operation of the joystick lever within a predetermined angle range from the neutral position.

Consequently, when the joystick lever is operated in the opposite direction from the rotation direction of the front frame and is located within a predetermined angle range from the neutral position, a counterforce is imparted to the operation of the joystick lever. That is, a counterforce is generated against the operation of the joystick lever so as to prevent going past the neutral position in reverse operation and prevent the difference between the joystick lever and the neutral position from increasing in the opposite direction from the rotation direction of the frame.

The work vehicle pertaining to the fourth aspect is the work vehicle pertaining to the first aspect, wherein the controller has a frame angular velocity determination component. The frame angular velocity determination component determines whether or not the frame angular velocity when the front frame rotates with respect to the rear frame as found on the basis of what is sensed by the angle sensor is greater than a first predetermined value. The controller actuates the force imparting component so that a counterforce will be generated when the frame angular velocity determination component has determined that the frame angular velocity is greater than the first predetermined value.

Consequently, when the frame angular velocity at the time of the reverse operation is larger than the first predetermined value, a counterforce against the operation of the joystick lever can be generated so as to prevent the control valve from exceeding the neutral position. For example, when the frame angular velocity is equal to or less than the first predetermined value in reverse operation, the vibration generated will be small even if the left and right positions of the control valve are suddenly switched and vibration does occur. Therefore, a counterforce can be generated only when necessary by providing the first predetermined value.

The work vehicle pertaining to the fifth aspect is the work vehicle pertaining to the fourth aspect, wherein the controller further has a deviation angle change calculator and a deviation angle change determination component. The deviation angle change calculator calculates the change per unit time in the deviation angle, which is the difference between the rotational angle of the joystick lever and the actual steering angle, on the basis of what is sensed by the displacement sensor and the angle sensor. The deviation angle change determination component determines whether the absolute value of the change per unit time in the deviation angle calculated by the deviation angle change calculator is greater than a second predetermined value. The controller controls the force imparting component so that a counterforce is generated when the deviation angle change determination component determines that the absolute value of the change per unit time in the deviation angle is greater than the second predetermined value.

Consequently, when the absolute value of the change per unit time in the difference between the rotational angles of the front frame and the joystick lever during reverse operation is greater than the second predetermined value, a counterforce against the operation of the joystick lever can be generated so as to prevent the control valve from going past the neutral position. For example, in reverse operation, if the absolute value of the change per unit time in the difference between the rotational angles of the front frame and the joystick lever is less than or equal to the second predetermined value, the vibration generated will be small even if the left and right positions of the control valve are suddenly switched and vibration does occur. Therefore, a counterforce can be generated only when necessary by providing the second predetermined value.

The work vehicle pertaining to the sixth aspect is the work vehicle pertaining to the first aspect, wherein the controller has a deviation angle change calculator and a reverse operation detector. The deviation angle change calculator calculates the change per unit time in the deviation angle, which is the difference between the rotational angle of the joystick lever and the actual steering angle, on the basis of what is sensed by the displacement sensor and the angle sensor. The reverse operation detector detects that the joystick lever has been operated in the opposite direction from the rotation direction of the front frame on the basis of the frame angular velocity when the front frame rotates with respect to the rear frame found on the basis of what is sensed by the angle sensor, and the change per unit time in the deviation angle calculated by the deviation angle change calculator.

This makes it possible to detect that the joystick lever has been operated in the opposite direction from the rotation direction of the front frame.

The work vehicle pertaining to the seventh aspect is the work vehicle pertaining to the first aspect, wherein the controller has a reverse operation detector. The reverse operation detector detects that the joystick lever has been operated in the opposite direction from the rotation direction of the front frame, based on the fact that the direction of the angular velocity of the joystick lever, which is found on the basis of what is sensed by the displacement sensor, is the opposite of the direction of the frame angular velocity when the front frame rotates with respect to the rear frame, which is found on the basis of what is sensed by the angle sensor.

This makes it possible to detect that the joystick lever has been operated in the opposite direction from the rotation direction of the front frame.

The work vehicle pertaining to the eighth aspect is the work vehicle pertaining to the third aspect, wherein the controller further has a deviation angle determination component. The deviation angle determination component determines whether or not the absolute value of the deviation angle, which is the difference between the rotational angle of the joystick lever and the actual steering angle, is less than a third predetermined value. The controller actuates the force imparting component so that a counterforce is generated when the deviation angle determination component determines that the absolute value of the deviation angle is less than the third predetermined value.

Thus, when the absolute value of the deviation angle is less than the third predetermined value, it can be determined that the joystick lever has been operated to a position near the neutral position of the control valve. Consequently, a counterforce can be imparted to the operation of the joystick lever upon reaching the vicinity of the neutral position during reverse operation.

The work vehicle pertaining to the ninth aspect is the work vehicle pertaining to the first aspect, further comprising a torque sensor. The torque sensor senses the torque produced by the operation of the joystick lever. The controller actuates the force imparting component so as to impart a counterforce in a magnitude based on the torque sensed by the torque sensor.

As a result, a force can be applied according to the torque applied by the operator to the joystick lever. For example, it is possible to control the magnitude of the imparted force so as to increase the assist force imparted by the force imparting portion when the torque applied to the joystick lever by the operator is high, and to reduce the assist force when the torque is low.

The work vehicle pertaining to the tenth aspect is the work vehicle pertaining to the first aspect, wherein the controller has a first input member and a second input member. The first input member is linked to the joystick lever and is displaced according to the amount of operation of the joystick lever. The second input member is displaced according to the actual steering angle. The controller controls the flow of fluid supplied to the hydraulic actuator according to the difference between the amount of displacement of the first input member and the amount of displacement of the second input member. The neutral position is the position at which the amount of displacement of the first input member matches the amount of displacement of the second input member.

Consequently, after the joystick lever has been operated, the steering angle is changed to follow the joystick lever, and control valve is in the neutral position when the operation amount of the joystick lever matches the steering angle.

The work vehicle pertaining to the eleventh aspect is the work vehicle pertaining to the first aspect, further comprising a steering valve. The steering valve adjusts the flow of fluid supplied to the hydraulic actuator on the basis of a pilot pressure inputted from the control valve. The control valve controls the flow of fluid supplied from the steering valve to the hydraulic actuator by adjusting the pilot pressure.

As a result, the pilot pressure is adjusted by operator operation, the amount of fluid supplied from the steering valve to the hydraulic actuator is controlled, and the steering angle of the front frame with respect to the rear frame is changed.

The work vehicle pertaining to the twelfth aspect is the work vehicle pertaining to the first aspect, further comprising a link. The link links the joystick lever to the control valve. The force imparting component has an electric motor and a transmission mechanism. The electric motor generates an assist force or a counterforce. The transmission mechanism transmits the assist force or counterforce produced by the electric motor to the link.

As a result, the force of the electric motor can be transmitted to the link that links the joystick lever to the control valve, and the force required to operate the joystick lever can be changed.

The work vehicle pertaining to the thirteenth aspect is the work vehicle pertaining to the first aspect, further comprising a speed sensor. The speed sensor senses the speed of the work vehicle. The controller controls the force imparting component so as to change the counterforce that is imparted to the operation of the joystick lever according to the speed sensed by the speed sensor.

As a result, the counterforce generated in the reverse operation can be changed according to the speed of the work vehicle.

The method for controlling a work vehicle pertaining to the fourteenth aspect is a method for controlling an articulated work vehicle in which a front frame and a rear frame are linked, and which has a joystick lever linked to a control valve that controls the supply of fluid to a hydraulic actuator that changes the steering angle of the front frame with respect to the rear frame, said method comprising a reverse operation detection step and a force imparting step. The reverse operation detection step involves detecting that the joystick lever has been operated in the opposite direction from the rotation direction of the front frame. The force imparting step involves imparting a counterforce to the operation of the joystick lever when reverse operation has been detected in the reverse operation detection step.

When reverse operation is thus detected, a counterforce is imparted to the operation of the joystick lever. Accordingly, the tactile sensation of the joystick lever becomes heavier in reverse operation, the sudden switching of the left and right positions of the control valve is slowed, and vibration of the vehicle body is less likely to occur.

Effects of the Invention

The present invention provides a work vehicle and a method for controlling a work vehicle with which vibration is less likely to occur when reverse operation is performed.

DETAILED DESCRIPTION OF EMBODIMENT(S)

A wheel loader in an embodiment pertaining to the present invention will now be described through reference to the drawings.

Embodiment

1. Configuration
1-1. Overview of Wheel Loader Configuration

Figure 1:
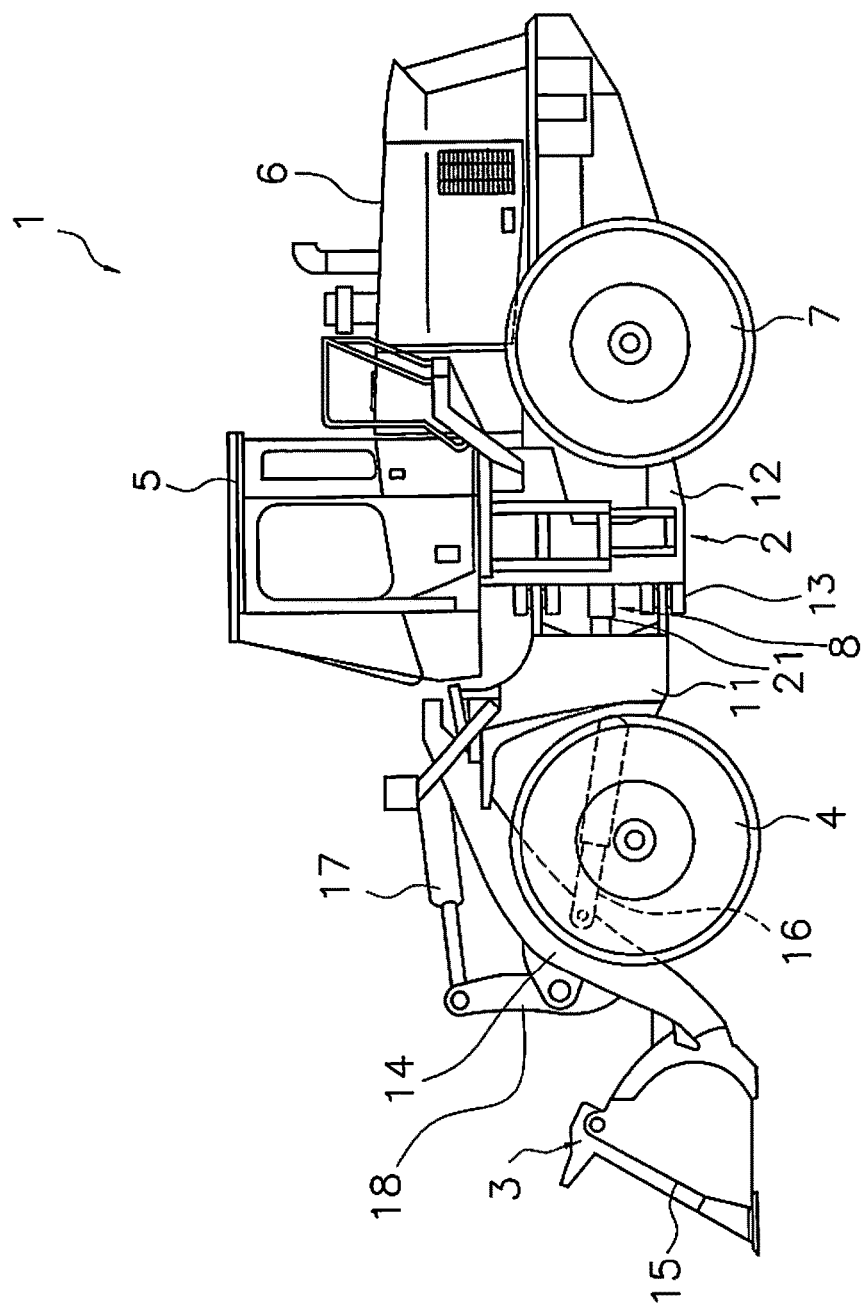
FIG. 1 is a side view of a wheel loader in an embodiment pertaining to the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operating device 8 (see FIG. 2, discussed below).

The wheel loader 1 performs earth loading and other such work with the work implement 3.

The body frame 2 is what is known as an articulated type, and has a front frame 11, a rear frame 12, and a linking shaft 13. The front frame 11 is disposed in front of the rear frame 12. The linking shaft 13 is provided in the center of the vehicle width direction, and pivotably links the front frame 11 to the rear frame 12. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14. The lift cylinder 16 and the bucket cylinder 17 are hydraulic cylinders. One end of the lift cylinder 16 is attached to the front frame 11, and the other end of the lift cylinder 16 is attached to the boom 14. The lift cylinder 16 telescopes in and out to pivot the boom 14 up and down. One end of the bucket cylinder 17 is attached to the front frame 11, and the other end of the bucket cylinder 17 is attached to the bucket 15 via a bell crank 18. The bucket cylinder 17 telescopes in and out to pivot the bucket 15 up and down.

The cab 5 is mounted on the rear frame 12, inside of which are disposed a steering wheel or joystick lever 24 (discussed below; see FIG. 2) for steering, a lever for controlling the work implement 3, various display devices, and so forth. The engine compartment 6 is disposed on the rear frame 12 to the rear of the cab 5, and houses an engine.

The steering operating device 8 will be discussed in detail below, but has steering cylinders 21 and 22. The amount of fluid supplied to the steering cylinders 21 and 22 is varied to change the steering angle of the front frame 11 with respect to the rear frame 12 and to change the travel direction of the wheel loader 1.

1-2. Steering Operation Device

Figure 2:
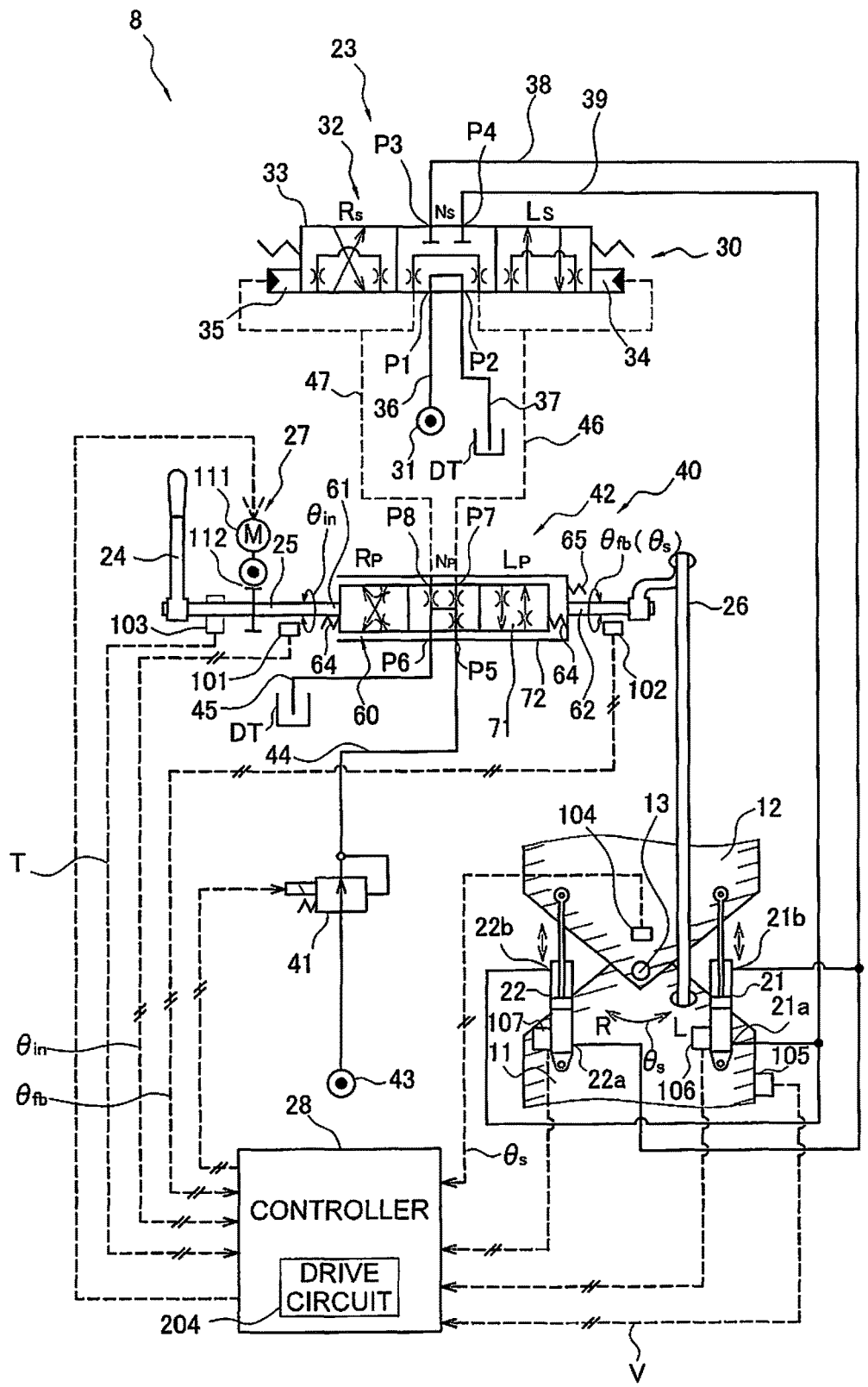
FIG. 2 is a hydraulic circuit diagram showing the configuration of a steering operation device of the wheel loader in FIG. 1.

FIG. 2 is a hydraulic circuit diagram of the configuration of the steering operation device 8. The steering operation device 8 in this embodiment mainly has a pair of steering cylinders 21 and 22, a steering hydraulic circuit 23, a joystick lever 24, a link 25, a linking mechanism 26, a force imparting component 27, and a controller 28.

1-2-1. Steering Cylinders

The steering cylinders 21 and 22 are driven hydraulically. The steering cylinders 21 and 22 are disposed side by side on the left and right sides in the vehicle width direction, flanking a linking shaft 13. The steering cylinder 21 is disposed on the left side of the linking shaft 13 (see FIG. 1). The steering cylinder 22 is disposed on the right side of the linking shaft 13. The steering cylinders 21 and 22 are attached at one end to the front frame 11, and at the other end to the rear frame 12.

The steering cylinder 21 is provided with an extension port 21a and a contraction port 21b, and the steering cylinder 22 is provided with an extension port 22a and a contraction port 22b.

When fluid is supplied to the extension port 21a of the steering cylinder 21 and the contraction port 22b of the steering cylinder 22 and fluid is discharged from the contraction port 21b of the steering cylinder 21 and the extension port 22a of the steering cylinder 22, the steering cylinder 21 extends and the steering cylinder 22 contracts. As a result, the steering angle θs changes and the vehicle turns to the right. When fluid is supplied to the contraction port 21b of the steering cylinder 21 and the extension port 22a of the steering cylinder 22 and fluid is discharged from the extension port 21a of the steering cylinder 21 and the contraction port 22b of the steering cylinder 22, the steering cylinder 21 contracts and the steering cylinder 22 extends. As a result, the steering angle θs changes and the vehicle turns to the left.

A steering angle sensor 104 for detecting a steering angle θs is provided near the linking shaft 13 disposed arranged between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for detecting the stroke of the cylinder, and the steering cylinder 22 is provided with a cylinder stroke sensor 107 for detecting the stroke of the cylinder. Sensing values from these cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a flow control valve that adjusts the flow of the fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

Also, the steering valve 32 has a valve body 33 that can move between a neutral position Ns, a left steering position Ls, and a right steering position Rs. When the valve body 33 is in the neutral position Ns, the main pump port P1 communicates with the main drain port P2. In this case, the first steering port P3 and the second steering port P4 are not in communication. When the valve body 33 is in the left steering position Ls, the main pump port P1 communicates with the first steering port P3, and the main drain port P2 communicates with the second steering port P4. When the valve body 33 is in the right steering position Rs, the main pump port P1 communicates with the second steering port P4, and the main drain port P2 communicates with the first steering port P3.

The steering valve 32 has a first pilot chamber 34 and a second pilot chamber 35. In a state in which no pilot pressure is supplied to the first pilot chamber 34 or the second pilot chamber 35, and the same pilot pressure is supplied to the first pilot chamber 34 and the second pilot chamber 35, the valve body 33 is in the neutral position Ns. In a state in which the pilot pressure is supplied only to the first pilot chamber 34, the valve body 33 is located in the left steering position Ls. In a state in which the pilot pressure is supplied only to the second pilot chamber 35, the valve body 33 is located in the right steering position Rs. When the valve body 33 is located in the left steering position Ls and the right steering position Rs, the steering valve 32 changes the opening surface area through which the fluid from the main hydraulic pressure source 31 passes according to the supplied pilot pressure. Consequently, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying the fluid from the pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer

The variable pressure reducer 41 reduces and adjusts the hydraulic pressure sent from the pilot hydraulic pressure source 43 to the pilot valve 42. The variable pressure reducer 41 incorporates an electromagnetic pressure reducing valve, and receives a command signal from the controller 28 to control the hydraulic pressure.

(ii) Pilot Valve

The pilot valve 42 is a rotary valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via a pilot hydraulic line 44, and the variable pressure reducer 41 is connected to the pilot hydraulic pressure source 43. The pilot drain port P6 is connected to the drain tank DT for recovering fluid via a pilot drain line 45. The first pilot port P7 is connected to the first pilot chamber 34 of the steering valve 32 via a first pilot line 46. The second pilot port P8 is connected to the second pilot chamber 35 of the steering valve 32 via a second pilot line 47.

The pilot valve 42 has a valve body component 60 that includes an operation spool 71 and an operation sleeve 72. With the operation sleeve 72 as a reference, the operation spool 71 can move between a neutral position Np, a left pilot position Lp, and a right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 in the left pilot position Lp with respect to the operation sleeve 72, the pilot pump port P5 communicates with the first pilot port P7, and the pilot drain port P6 communicates with the second pilot port P8. Also, when the operation spool 71 is in the right pilot position Rp with respect to the operation sleeve 72, the pilot pump port P5 communicates with the second pilot port P8, and the pilot drain port P6 communicates with the first pilot port P7.

Figure 3:
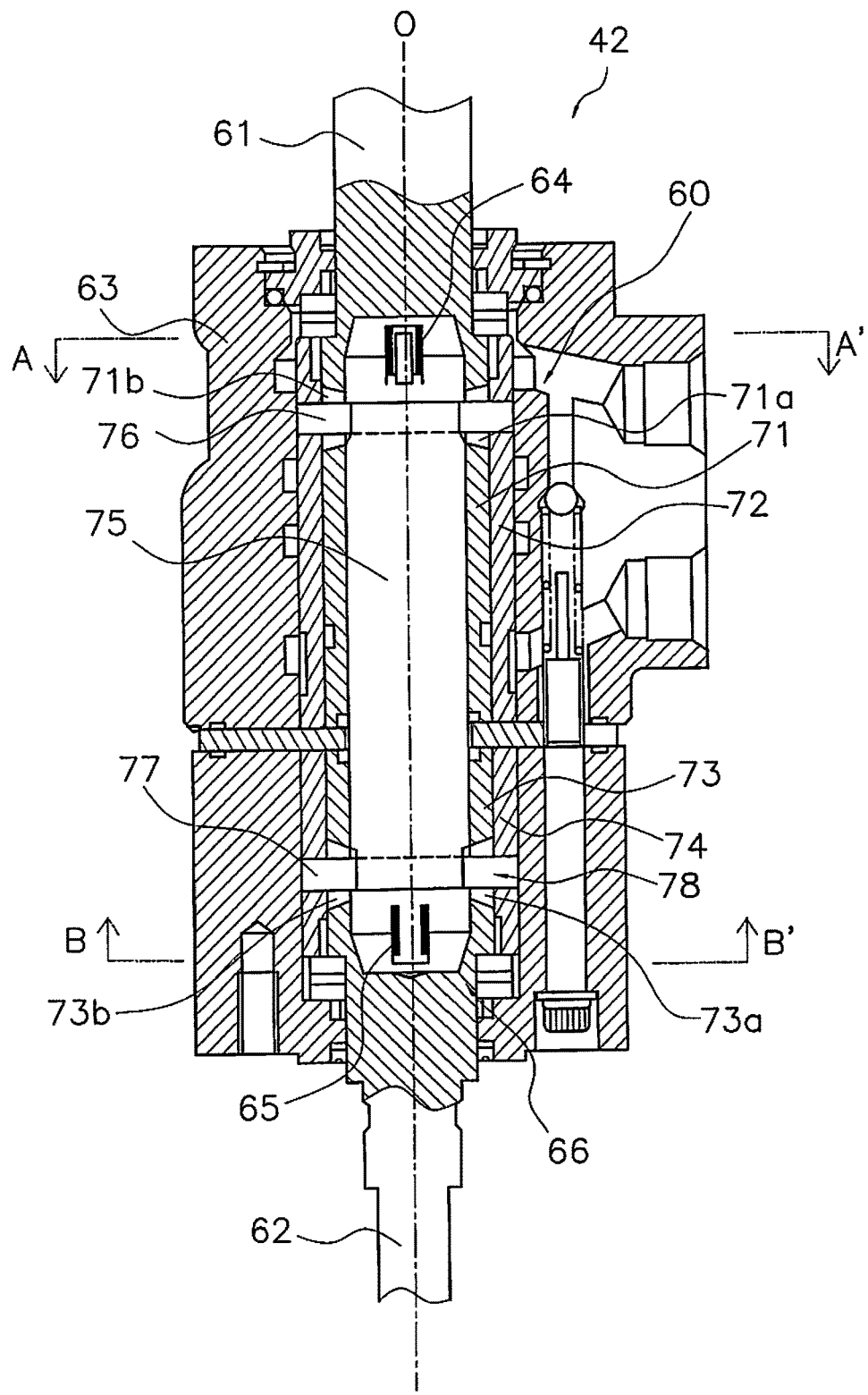
FIG. 3 is a cross section of the configuration of the pilot valve in FIG. 2.

FIG. 3 is a cross section of the configuration of the pilot valve 42.

The pilot valve 42 mainly has the valve body component 60, an operation input shaft 61, a feedback input shaft 62, a housing 63, a first spring 64, a second spring 65, and a feedback component 66.

Operation Input Shaft

The operation input shaft 61 is provided so as to be rotatable around its center axis O, and is inserted into the housing 63. The operation input shaft 61 is linked to the joystick lever 24 (discussed below) via the link 25. The operation input shaft 61 rotates at the same rotational angle as the rotational angle θin to the left and right of the joystick lever 24.

Feedback Input Shaft

The feedback input shaft 62 is disposed coaxially with the operation input shaft 61, and is provided so as to be rotatable around the center axis O. The feedback input shaft 62 is inserted into the housing 63 so as to be opposite the operation input shaft 61. The feedback input shaft 62 is linked to the front frame 11 via a linking mechanism 26 (discussed below) and rotates at the same rotational angle as the steering angle θs of the front frame 11 with respect to the rear frame 12.

Housing

A substantially cylindrical space is formed in the housing 63, and the operation input shaft 61 and the feedback input shaft 62 are inserted as mentioned above. The housing 63 accommodates the valve body component 60 and the feedback component 66, and the pilot pump port P5, the pilot drain port P6, the first pilot port P7, and the second pilot port P8 are formed.

Valve Body Component

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and disposed coaxially with the operation input shaft 61, and is connected to the operation input shaft 61. The joystick lever 24 is connected to the operation input shaft 61 via the link 25 (discussed below). When the operator operates the joystick lever 24 to the right side by the rotational angle θin, the operation input shaft 61 and the operation spool 71 also rotate to the right around the center axis O by the rotational angle gin. Slits 71a and 71b are formed in the operation spool 71 near the operation input shaft 61 along the peripheral direction at two positions opposite each other so as to sandwich the center axis O in between.

The operation sleeve 72 has a substantially cylindrical shape and is disposed on the outside of the operation spool 71 and inside the housing 63 so as to be rotatable with respect to the operation spool 71 and the housing 63.

In this Specification, the terms right rotation and left rotation indicate the rotation direction when viewed from above.

First Spring

The first spring 64 is inserted between the operation spool 71 and the operation sleeve 72, which are rotatable with respect to each other, and generates a counterforce corresponding to the difference in rotational angle between the two.

Figure 4:
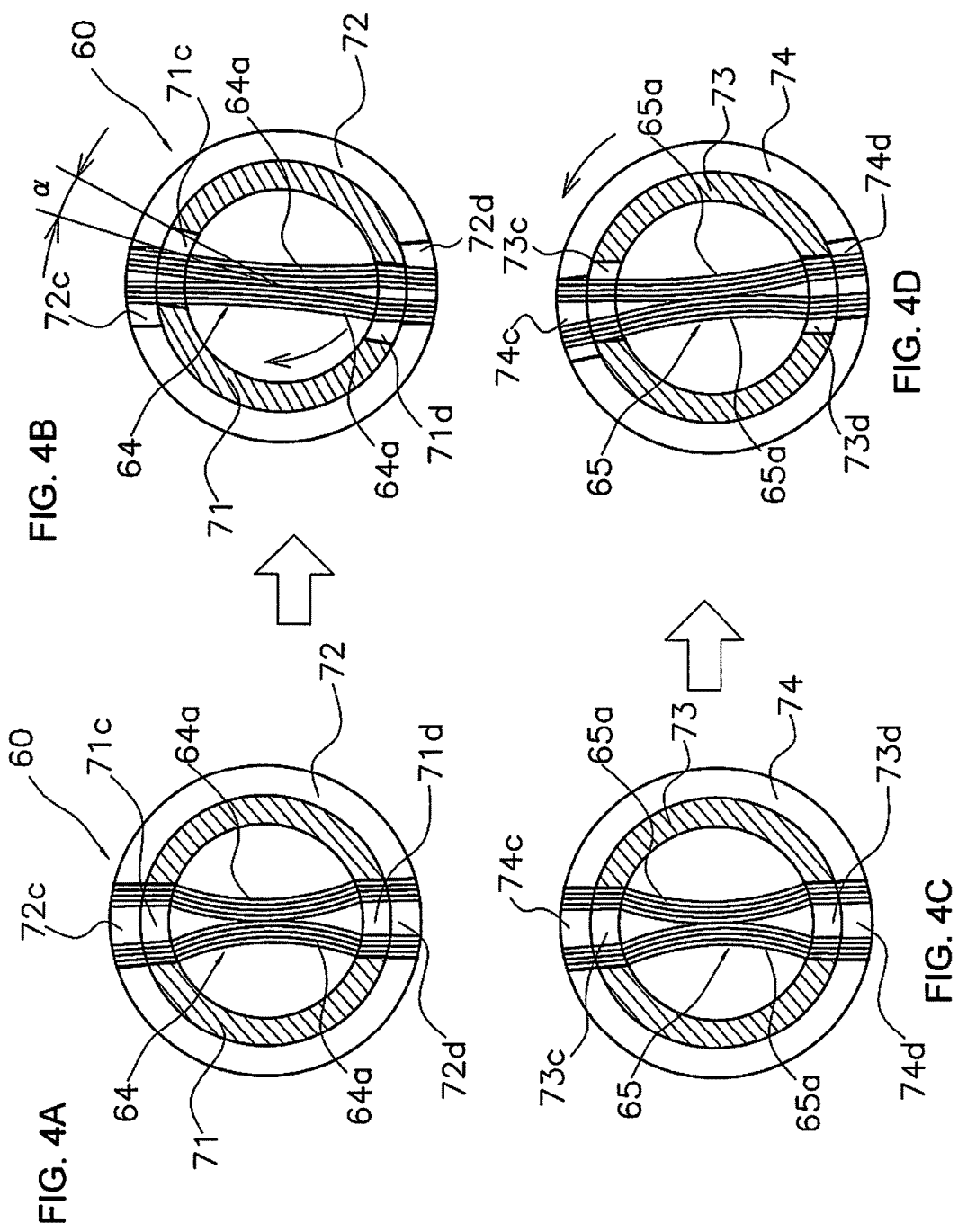
FIGS. 4A and 4B are cross sections along the AA' line in FIG. 3, and FIGS. 4C and 4D are cross sections along the BB' line in FIG. 3.

FIG. 4A is a cross section along the AA' line perpendicular to the center axis O. As shown in FIG. 4A, rectangular holes 71c and 71d are provided to the operation spool 71 on diametrically opposed walls. Rectangular grooves 72c and 72d are formed in the diametrically opposed walls at the end of the operation sleeve 72 on the operation input shaft 61 side. The first spring 64 is formed by two leaf spring units 64a in which a plurality of convex leaf springs are stacked. The two leaf spring units 64a are disposed so that their convex parts are opposite each other so as to form an X shape as in FIG. 4A. The two leaf spring units 64a go through the holes 71c and 71d in the operation spool 71, and both ends thereof go into the grooves 72c and 72d of the operation sleeve 72. The operation spool 71 and the operation sleeve 72 are thus linked by the first spring 64.

As shown in FIG. 4A, a state in which the positions of the hole 71c and the groove 72c in the peripheral direction substantially coincide, and the positions of the hole 71d and the groove 72d in the peripheral direction substantially coincide, is a state in which the valve body component 60 is in the neutral position Np.

Also, when the joystick lever 24 is operated, the operation spool 71 rotates with respect to the operation sleeve 72 as shown in FIG. 4B, and the operation spool 71 moves with respect to the operation sleeve 72 to the left pilot position Lp or the right pilot position Rp. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated in the joystick lever 24. In other words, the first spring 64 biases the operation spool 71 to the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, coaxially with the operation input shaft 61 and the feedback input shaft 62 (center axis O). The drive shaft 75 is disposed inside the operation spool 71. The first center pin 76 is disposed perpendicular to the center axis O at the end of the drive shaft 75 on the operation input shaft 61 side. Both ends of the first center pin 76 go through the slits 71a and 71b and are fixed to the operation sleeve 72. As will be described in detail below, the first center pin 76 and the slits 71a and 71b restrict the rotational angle of the operation spool 71 with respect to the operation sleeve 72 to an angle within a predetermined range. Since the first center pin 76 is fixed to the operation sleeve 72 and the drive shaft 75, the operation sleeve 72 that is integrated with the drive shaft 75 also rotates when the drive shaft 75 is rotated.

The feedback spool 73 has a substantially cylindrical shape and is disposed coaxially with the feedback input shaft 62, and is linked to the feedback input shaft 62. Slits 73a and 73b are formed near the feedback input shaft 62 of the feedback spool 73 along the peripheral direction at two locations that are opposite each other and sandwich the central axis O in between. The drive shaft 75 is disposed inside the feedback spool 73. The feedback input shaft 62 is linked to the front frame 11 via the linking mechanism 26 (discussed below), and when the front frame 11 rotates to right by the steering angle θs with respect to the rear frame 12, the feedback input shaft 62 and the feedback spool 73 also rotate to the right by the same rotational angle θs as the steering angle θs.

The feedback sleeve 74 is substantially cylindrical in shape, and is disposed outside of the feedback spool 73 and inside the housing 63, rotatably with respect to the feedback spool 73 and the housing 63.

The restrictor 78 restricts the rotation of the feedback sleeve 74 with respect to the feedback spool 73 to an angle within a predetermined range. The restrictor 78 is made up of a second center pin 77 and walls 73ae and 73be (discussed below; see FIG. 7) at both ends in the peripheral direction of the slits 73a and 73b.

The second center pin 77 is disposed perpendicular to the center axis O, at the end of the drive shaft 75 on the feedback input shaft 62 side. Both ends of the second center pin 77 are fixed to the feedback sleeve 74 through the slits 73a and 73b. The second center pin 77 and the slits 73a and 73b restrict the rotation of the feedback sleeve 74 with respect to the feedback spool 73 to an angle within a predetermined range. Also, since the second center pin 77 is fixed to the feedback sleeve 74 and the drive shaft 75, when the feedback sleeve 74 rotates, the drive shaft 75 that is integrated with the feedback sleeve 74 also rotates. The rotation of the drive shaft 75 causes the operation sleeve 72 that is fixed to the drive shaft 75 by the first center pin 76 to rotate.

Second Spring

The second spring 65 is inserted between the feedback spool 73 and the feedback sleeve 74, which are able to rotate relative to each other, and generates a counterforce corresponding to the rotational difference between the two. FIG. 4C is cross section along the BB' line in FIG. 3.

As shown in FIG. 4C, square holes 73c and 73d are provided to the diametrically opposed walls of the feedback spool 73.

Also, rectangular grooves 74c and 74d are formed in the diametrically opposed walls at the end of the feedback sleeve 74 on the feedback input shaft 62 side. The second spring 65 is formed from two leaf spring units 65a in which a plurality of convex leaf springs are stacked. The two leaf spring units 65a are disposed so that their convex parts are opposite each other so as to form an X shape as in FIG. 4C. The two leaf spring units 65a go through the holes 73c and 73$d$ in the feedback spool 73, and both ends thereof go into the grooves 74$c$ and 74$d$ of the feedback sleeve 74. The feedback spool 73 and the feedback sleeve 74 are thus linked by the second spring 65. In the state in FIG. 4C, the hole 73$c$ and the groove 74$c$ coincide in the peripheral direction, and the hole 73$d$ and the groove 74$d$ coincide in the peripheral direction. The feedback sleeve 74 is biased by the second spring 65 so that the positions of the grooves 74$c$ and 74$d$ in the peripheral direction match the positions of the holes 73$c$ and 73$d$ of the feedback spool 73 in the peripheral direction.

The first spring 64 bends until the operation spool 71 is restricted with respect to the operation sleeve 72, but the second spring 65 is set so that it begins to bend when subjected to a force that is greater than the counterforce produced by the first spring 64 until the operation spool 71 is restricted.

Figure 7:
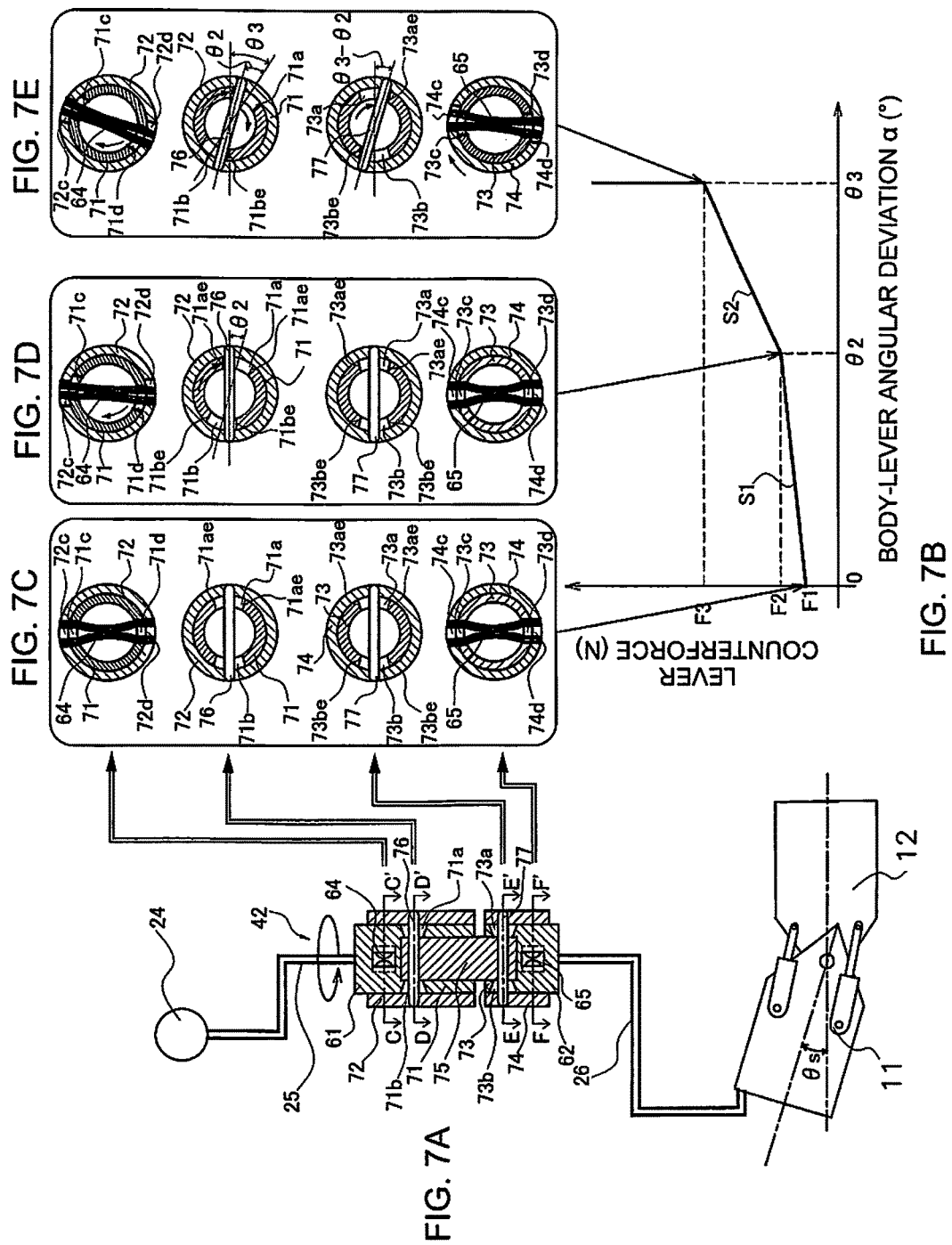
FIG. 7A is a simplified diagram of the pilot valve in FIG. 3.
FIG. 7b is a graph of the relation between the lever counterforce and the body-lever angular deviation in the pilot valve in FIG. 7A.
FIG. 7C is a cross section along the CC', DD', EE', and FF' lines in FIG. 7A when the angular deviation α is zero.
FIG. 7D is a cross section along the CC', DD', EE', and FF' lines in FIG. 7A when the angular deviation α is θ2.
FIG. 7E is a cross section along the CC', DD', EE', and FF' lines in FIG. 7A when the angular deviation α is θ3.

As described later in below through reference to FIG. 7, when the operation spool 71 rotates with respect to the operation sleeve 72 up to the angle at which the operation spool 71 is restricted, and the joystick lever 24 is then operated, as shown in FIG. 4D, the second spring 65 bends and the feedback sleeve 74 rotates with respect to the feedback spool 73. FIG. 4D is a cross section along the BB' line in FIG. 3, and since the view is from below, the arrow indicating the rotational direction is reversed from that in FIG. 4B.

That is, when the joystick lever 24 is operated past the angle at which the operation spool 71 is restricted with respect to the operation sleeve 72, the operator must operate the joystick lever 24 against the biasing force of the second spring 65.

With the above configuration of the feedback unit 66, when the feedback input shaft 62 rotates in accordance with a change in the steering angle, the feedback spool 73 rotates, and the feedback sleeve 74 that is linked to the feedback spool 73 via the second spring 65 also rotates. Then, the operation sleeve 72, which is fixed to the feedback sleeve 74 via the second center pin 77, the drive shaft 75, and the first center pin 76, also rotates, which produces a change in the difference in rotational angle between the operation spool 71 and the operation sleeve 72 and changes the pilot pressure.

That is, with the pilot valve 42, the position of the operating spool 71 with respect to the operation sleeve 72 moves to the neutral position Np, the left pilot position Lp, or the right pilot positions Rp, according to the difference $\alpha$ between the rotational angle $\theta$in of the operation input shaft 61 and the rotational angle $\theta$fb (matches the steering angle $\theta$s) of the feedback input shaft 62. When the rotational angle difference $\alpha$ is zero, the operation spool 71 is in the neutral position Np with respect to the operation sleeve 72. Also, when the operation spool 71 is in the left pilot position Lp or the right pilot positions Rp with respect to the operation sleeve 72, the pilot valve 42 changes the opening surface area through which fluid from the pilot hydraulic source 43 passes, according to the rotational angle difference $\alpha$. Consequently, the pilot pressure sent from the pilot valve 42 to the steering valve 32 is adjusted according to the rotational angle difference $\alpha$.

A first rotational angle sensor 101, constituted by a rotary sensor, for example, is provided to the input shaft 61. The first rotational angle sensor 101 senses the rotational angle $\theta$in of the operation input shaft 61. A second rotational angle sensor 102, constituted by a rotary sensor, for example, is provided to the feedback input shaft 62. The second rotational angle sensor 102 senses the rotational angle $\theta$fb (=$\theta$s) of the feedback input shaft 62. The rotational angles $\theta$in and $\theta$fb sensed by the first rotational angle sensor 101 and the second rotational angle sensor 102 are sent as sensing signals to the controller 28.

As discussed above, the steering angle $\theta$s at the linking shaft 13 is also sensed by a steering angle sensor 104, but since the rotational angle $\theta$fb of the feedback input shaft 62 matches the steering angle $\theta$s, the steering angle sensor 104 may be omitted.

1-2-3. Joystick Lever, Link

Figure 5:
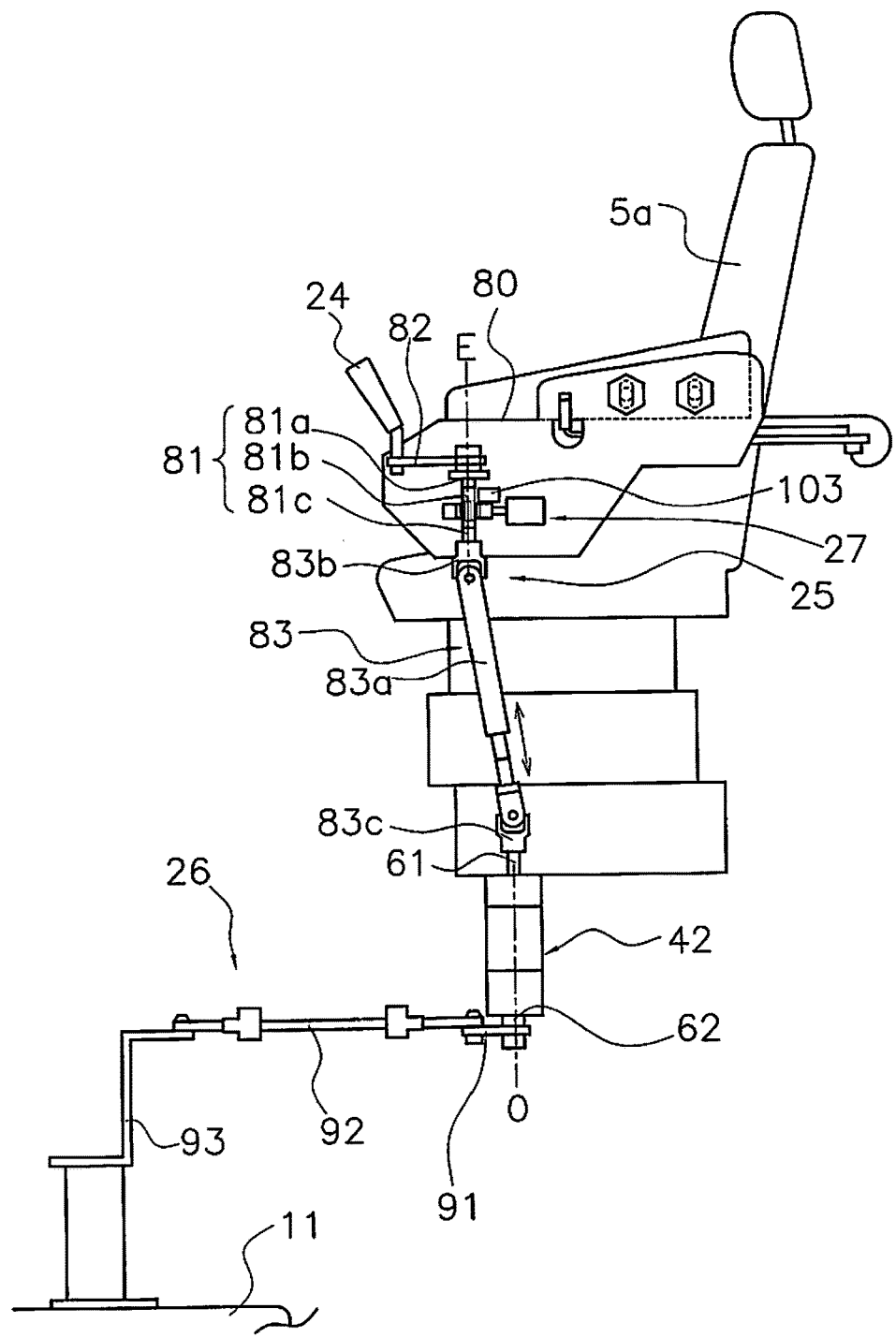
FIG. 5 is a side view of the link and linking mechanism in FIG. 2.

FIG. 5 is a side view of the configuration inside the cab 5. An operator's seat 5$a$ in which the operator sits is provided inside the cab 5. A steering box 80 is disposed on the left side in the vehicle width direction of the operator's seat 5$a$.

The joystick lever 24 is disposed protruding obliquely upward toward the front from the steering box 80.

The link 25 links the joystick lever 24 and the pilot valve 42. The link 25 mainly has a steering operation shaft 81, a linking bar 82, and a universal joint 83.

The steering operation shaft 81 is disposed vertically, and is supported rotatably around its center axis E by the steering box 80. The linking bar 82 is disposed inside the steering box 80, and links the joystick lever 24 to the steering operation shaft 81.

More precisely, the steering operation shaft 81 is made up of a lever-side shaft 81$a$, an input shaft 81$b$, and a valve-side shaft 81$c$ that are connected in that order (see FIG. 8 discussed below). That is, one end of the lever-side shaft 81$a$ is linked to the linking bar 82, and the other end of the lever-side shaft 81$a$ is linked to one end of the input shaft 81$b$. The other end of the input shaft 81$b$ is connected to one end of the valve-side shaft 81$c$, and the other end of the valve-side shaft 81$c$ is connected to the universal joint 83. An assist force or a counterforce from the force imparting component 27 (discussed below) is inputted to the input shaft 81$b$.

The universal joint 83 links the steering operation shaft 81 to the operation input shaft 61 of the pilot valve 42 disposed near the operator's seat 5$a$. The universal joint 83 has a telescoping center portion 83$a$ and joint portions 83$b$ and 83$c$ disposed at both ends of the center portion 83$a$. The joint portion 83$b$ is linked to the steering operation shaft 81. The joint portion 83$c$ is linked to the operation input shaft 61.

Figure 6:
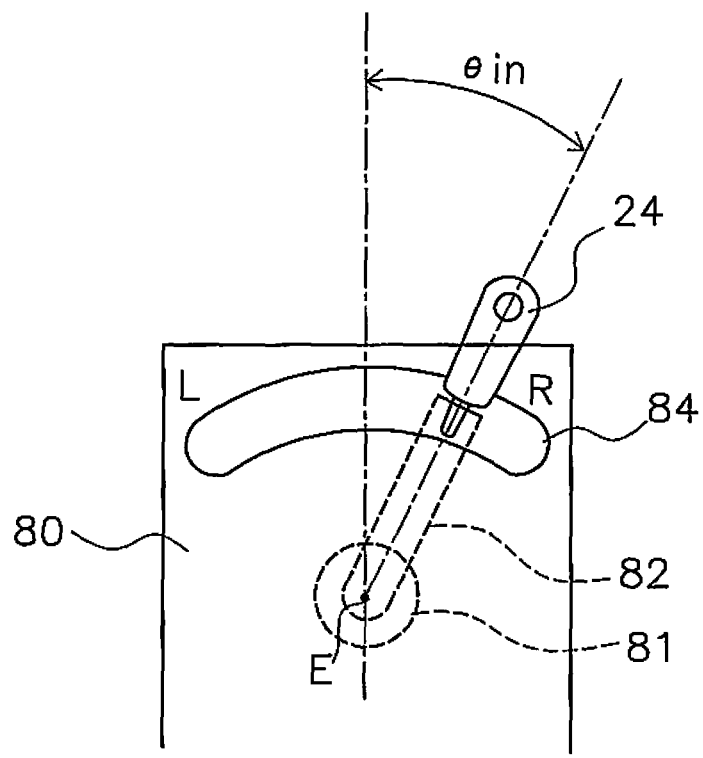
FIG. 6 shows joystick lever in FIG. 5 as seen from above.

FIG. 6 is a plan view of the area near the joystick lever 24 as seen from above. As shown in FIG. 6, the joystick lever 24 is formed protruding obliquely upward from an arc-shaped hole 84 formed in the upper face of the steering box 80. The joystick lever 24 is capable of turning horizontally around the steering operation shaft 81 (more precisely, the center axis E). Also, the edge of the right end of the hole 84 of the steering box 80 is marked with an R, and the edge of the left end is marked with an L.

For example, as shown in FIG. 6, when the operator rotates joystick lever 24 by the rotational angle $\theta$in to the right from the center position, the steering operation shaft 81 also rotates to the right by the rotational angle $\theta$in. This rotation of the steering operation shaft 81 by the rotational angle $\theta$in is transmitted through the universal joint 83 to the operation input shaft 61, and the operation input shaft 61 also rotates to the right by the rotational angle $\theta$in. The same applies when the joystick lever 24 is rotated to the left.

1-2-4. Linking Mechanism

The linking mechanism 26 has a follow-up lever 91, a follow-up link 92, and a bracket 93. The follow-up link 92 is fixed to the feedback input shaft 62 of the pilot valve 42. The bracket 93 is fixed to the front frame 11. The follow-up link 92 is linked to the follow-up lever 91 and the bracket 93.

This linking mechanism 26 links the front frame 11 to the pilot valve 42 disposed on the rear frame 12.

The linking mechanism 26 makes the steering angle θs of the front frame 11 with respect to the rear frame 12 be the same as the rotational angle θfb of the feedback input shaft 62.

That is, when the front frame 11 rotates to the right side around the linking shaft 13 with respect to the rear frame 12 by the steering angle θs, the feedback input shaft 62 also rotates right by the rotational angle θs via the linking mechanism 26, and when the front frame 11 rotates to the left side by the steering angle θs, the feedback input shaft 62 also rotates left by the rotational angle θs via the linking mechanism 26.

1-2-5. Lever Counterforce

The lever counterforce produced by the first spring 64 and the second spring 65 when the joystick lever 24 is operated will now be described.

FIG. 7A is a simplified diagram of the pilot valve 42. FIG. 7b is a graph of the relation between lever counterforce and the body-lever angular deviation. The body-lever angular deviation α is the difference (θin −θfb) between the rotational angle θin of the joystick lever 24 and the steering angle θs of the front frame 11 with respect to the rear frame 12. FIG. 7C is a cross section along the CC', DD', EE', and FF' lines in FIG. 7A when the angular deviation α is zero. FIG. 7D is a cross section along the CC', DD', EE', and FF' lines in FIG. 7A when the angular deviation α is θ2, and FIG. 7E is a cross section along the CC', DD', EE', and FF' lines in FIG. 7A when the angular deviation α is θ3. As shown in FIG. 7A, the cross sections along the CC', DD', EE', and FF' lines are all as seen from above. In FIG. 7b, play in the joystick lever 24 is not taken into account in order to make the illustration easier to understand.

When the operator rotates the joystick lever 24 by the rotational angle θin from the center position, the operation input shaft 61 also rotates by the rotational angle θin. Meanwhile, since the response of the steering cylinders 21 and 22 is delayed, the steering angle θs increases gradually in accordance with the rotational angle θin. The rotational angle θin of the joystick lever 24 represents the target steering angle, while the steering angle θs indicates the actual steering angle. The feedback input shaft 62 also rotates by the same rotational angle θs in response to a change in the steering angle θs. The feedback spool 73 also rotates together with the feedback input shaft 62, and this rotation causes the feedback sleeve 74 linked via the second spring 65 to rotate as well.

Since the feedback sleeve 74 and the operation sleeve 72 are integrated with the first center pin 76, the second center pin 77, and the drive shaft 75, rotation of the feedback sleeve 74 causes the operation sleeve 72 to rotate as well.

Specifically, the difference between the rotational angle of the operation spool 71 and the rotational angle of the operation sleeve 72 corresponds to the angular deviation α (see FIG. 4B).

Since the first spring 64 biases the operation spool 71 to the neutral position Np with respect to the operation sleeve 72, the joystick lever 24 must be operated against the biasing force of the first spring 64 in order to increase the angular deviation α.

The first spring 64 has the spring property S1 shown in FIG. 7b. With the spring property S1 of the first spring 64, the joystick lever 24 must be operated with a force at or above an initial counterforce F1 (the force required to begin to bend the first spring 64) in order to rotate the operation input shaft 61. Also, with the spring property S1 of the first spring 64, the lever counterforce increases in proportion to the angular deviation α. That is, as the angular deviation α increases, the force required to operate the joystick lever 24 increases.

As shown in FIG. 7C, in the neutral position Np where the angular deviation α is zero, the first center pin 76 is disposed in the center of the slits 71a and 71b of the operation the spool 71. The second center pin 77 is disposed in the center of the slits 73a and 73b of the feedback spool 73.

The joystick lever 24 is then rotated to the right side, for example, to increase the angular deviation α, and when the angular deviation α reaches the angle 92, as shown in FIG. 7D, the first center pin 76 hits the wall 71ae formed in the peripheral direction of the slit 71a, and the wall 71be formed in the peripheral direction of the slit 71b. At this point the second center pin 77 is disposed in the center of the slits 73a and 73b of the feedback spool 73. This is because if we let F2 be the counterforce produced by the first spring 64 when the angular deviation α is the angle θ2, the initial counterforce (the force needed to start bending the second spring 65) is set to F2 as indicated by the spring property S2 of the second spring 65. The initial counterforce of the second spring 65 may be set higher than F2, or may be greater than or equal to F2.

Furthermore, the operator must operate the joystick lever 24 against the counterforce of the second spring 65 to rotate it to the right side. That is, when the joystick lever 24 is further rotated to the right side, since the first center pin 76 is hitting the walls 71ae and 71be, it is necessary to rotate the operation sleeve 72 if an attempt is made to rotate the operation spool 71. Also, as discussed above, the operation sleeve 72 is integrated with the feedback sleeve 74, and the feedback spool 73 is connected to the feedback input shaft 62. Therefore, when the joystick lever 24 is further rotated to the right side, the operator operates against the counterforce of the second spring 65, as shown in FIG. 4D.

When the angular deviation α reaches θ3, as shown in FIG. 7E, the second center pin 77 hits the wall 73ae formed in the peripheral direction of the slit 73a and the wall 73be formed in the peripheral direction of the slit 73b. Thus, the second center pin 77 is able to rotate by an angle (θ3−θ2). That is, the pilot valve 42 is configured so that the angular deviation α will not exceed the angle θ3. Therefore, as shown in FIG. 7b, the lever counterforce goes straight up at the angle θ3. If the second center pin 77 strikes the walls 73ae and 73be with sufficient energy, a sharp rebound will be generated to put a burden on the operator's wrist. This angle θ3 is also referred to as the catch-up angle.

In FIG. 7b, an example was illustrated in which the joystick lever 24 was rotated to the right side, but the same applies when the rotation is to the left side, in which case the angular deviation α becomes a negative value, in left and right symmetry as indicated by the dotted line L3 shown in FIG. 13 (discussed below). That is, the first center pin 76 hits the walls 71ae and 71be at an angle of −θ2, and the second center pin 77 hits the walls 73ae and 73be at −θ3. Thus, the pilot valve 42 is configured so that the absolute value of the angular deviation α will not exceed the angle θ3.

Until the angular deviation α reaches θ2, there will be a difference between the rotational angle of the operation spool 71 and the rotational angle of the operation sleeve 72, but once the angle θ2 is exceeded, there is no longer any difference between the rotational angles of the operation spool 71 and the operation sleeve 72, so the aperture of the pilot valve 42 stays constant. Also, while the aperture of the pilot valve 42 remains constant when the angular deviation α is between the angles θ2 and θ3, the pilot pressure should be varied according to the angular deviation by controlling the variable pressure reducer 41.

1-2-6. Force Imparting Component

Figure 8:
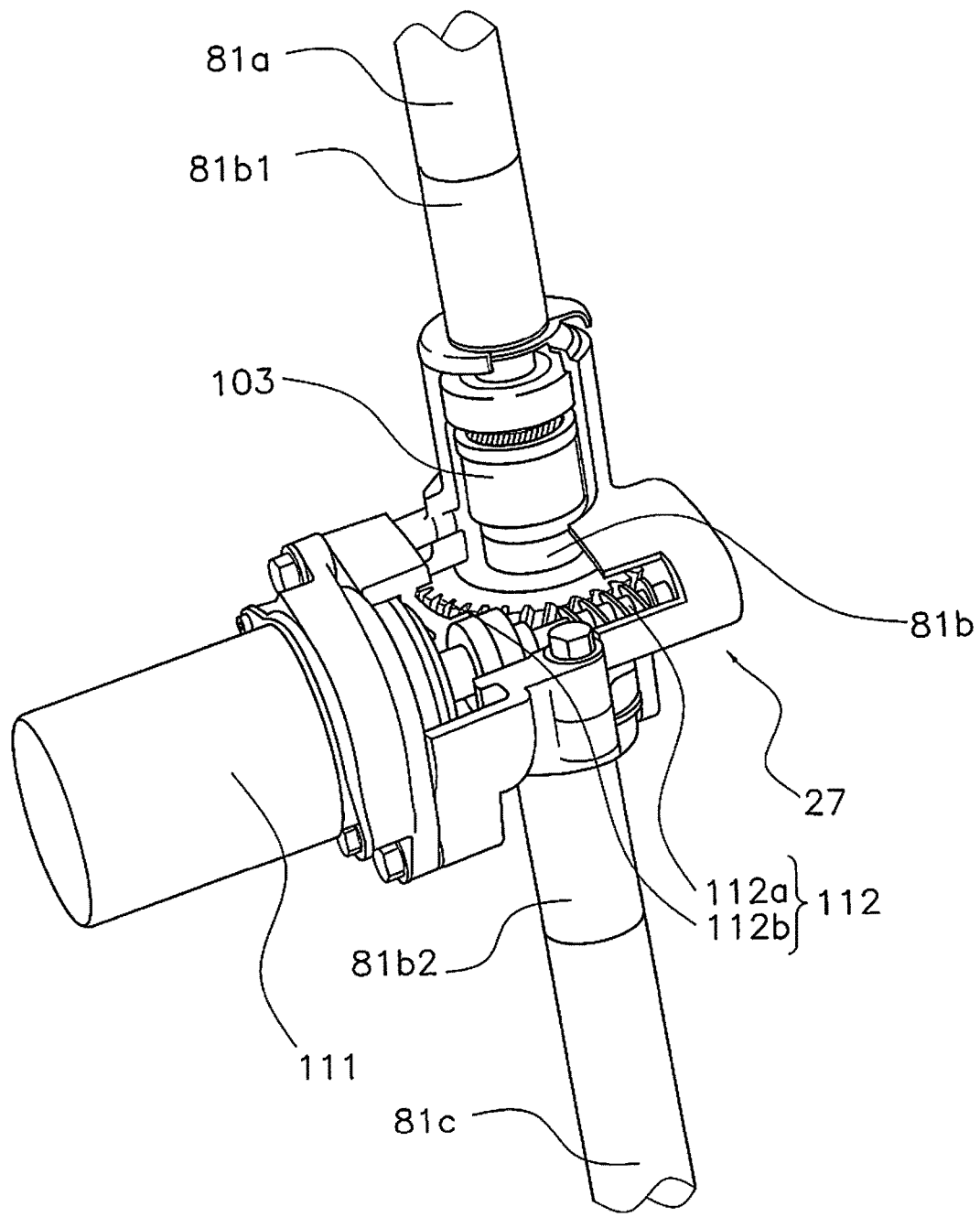
FIG. 8 is an oblique view of the configuration of the force imparting component in FIG. 2.

FIG. 8 is an oblique view of the force imparting component 27. The force imparting component 27 imparts an assist force or counterforce to the operation of the joystick lever 24. The force imparting component 27 has an electric motor 111 and a worm gear 112. The worm gear 112 has a cylindrical worm 112a and a worm wheel 112b. The worm wheel 112b is provided around the above-mentioned input shaft 81b, and meshes with the cylindrical worm 112a. The output shaft of the electric motor 111 is connected to the cylindrical worm 112a, and rotates the cylindrical worm 112a around its center axis. The electric motor 111 is driven on the basis of a command from a drive circuit 204 provided to the controller 28.

The first end 81b1 of the input shaft 81b is connected to the lever-side shaft 81a, and the second end 81b2 is connected to the valve-side shaft 81c.

When the electric motor 111 is driven, the cylindrical worm 112a rotates, this rotation causes the worm wheel 112b to rotate, and rotational force is also produced at the input shaft 81b that is fixed to the worm wheel 112b. Rotational force can be applied for left rotation or right rotation to the input shaft 81b by changing the direction of rotation of the cylindrical worm 112a.

For example, when the joystick lever 24 is rotated to the right, an assist force is imparted to the operation of the joystick lever 24 by applying a force in the right rotation direction to the input shaft 81b. Also, when the joystick lever 24 is rotated to the right, a counterforce is imparted to the operation of the joystick lever 24 by applying a force in the left rotation direction to the input shaft 81b.

A torque sensor 103 is provided to the input shaft 81b. The torque sensor 103 senses the torque generated at the input shaft 81b exerted on the joystick lever 24 by the operator. The torque sensor 103 in this embodiment, for example, senses the torque generated at the input shaft 81b and the rotation direction of the input shaft 81b by sensing the twisting of a torsion bar with a coil, for example. The sensed rotation direction and torque T are outputted to the controller 28 as a steering torque signal.

1-2-7. Controller

Figure 9:
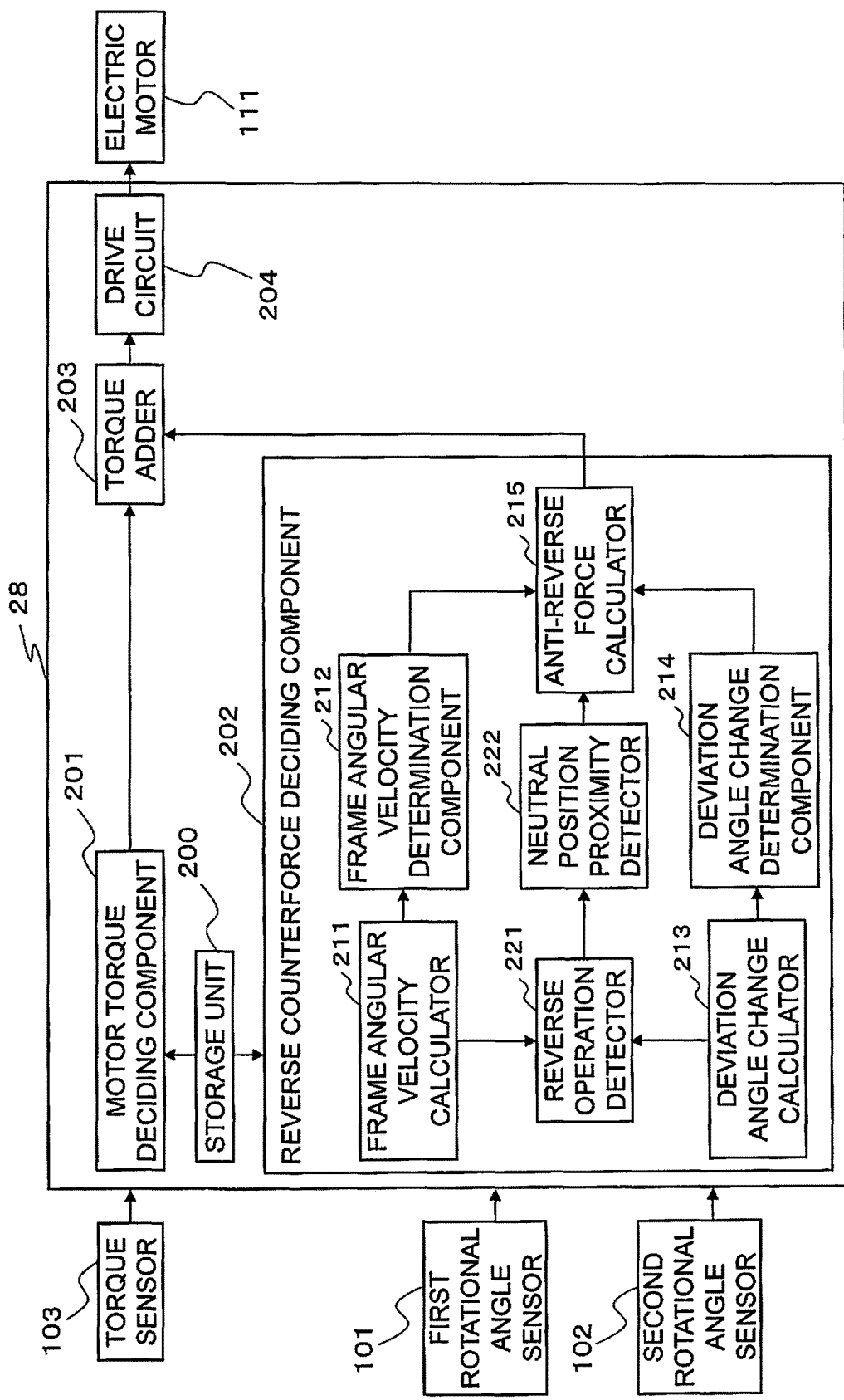
FIG. 9 is a block diagram of the configuration of the controller in FIG. 2.

FIG. 9 is a block diagram of the configuration of the controller 28.

As shown in FIG. 9, the controller 28 has a storage unit 200, a motor torque deciding component 201, a reverse counterforce deciding component 202, a torque adder 203, and a drive circuit 204.

The motor torque deciding component 201, the reverse counterforce deciding component 202, and the torque adder 203 are executed by an arithmetic unit such as a CPU.

The storage unit 200 stores the relation between the imparted assist torque versus the lever input torque (first assist torque information), and the relation between the imparted assist torque versus the deviation angle (second assist torque information). The storage unit 200 stores predetermined values for frame angular velocity, predetermined values for the change per unit of time in deviation angle, and predetermined values for deviation angle, which are used by the reverse counterforce deciding component 202. The storage unit 200 may be provided inside the controller 28, or may be provided outside the controller 28. The storage unit 200 is made up of a RAM, a ROM, an HDD, or the like.

The motor torque deciding component 201 decides a motor torque (Tm) on the basis of the first assist torque information and second assist torque information stored in the storage unit 200.

The reverse counterforce deciding component 202 detects that the operator has operated the joystick lever 24 in reverse operation on the basis of the sensing signals from the first rotational angle sensor 101 and the second rotational angle sensor 102, and decides the counterforce to be imparted.

The torque adder 203 computes the sum of the motor torque (Tm) decided by the motor torque deciding component 201 and the anti-reverse force (Th) decided by the reverse counterforce deciding component 202, and calculates the target assist torque (Tm) to be imparted to the input shaft 81b.

The drive circuit 204 drives the electric motor 111 on the basis of the target assist torque (Tm) thus calculated.

The reverse counterforce deciding component 202 will now be described.

The reverse counterforce deciding component 202 has a reverse operation detector 221, a neutral position proximity detector 222, a frame angular velocity calculator 211, a frame angular velocity determination component 212, a deviation angle change calculator 213, a deviation angle change determination component 214, and an anti-reverse force calculator 215.

The frame angular velocity calculator 211 calculates the angular velocity ($d\theta s/dt$) of the front frame 11 when the front frame 11 is rotated with respect to the rear frame 12, on the basis of the sensed value $\theta fb$ (=$\theta s$) of the second rotational angle sensor 102.

The frame angular velocity determination component 212 determines whether or not the absolute value ($|d\theta s/dt|$) of the angular velocity calculated by the frame angular velocity calculator 211 is greater than the predetermined value for frame angular velocity stored in the storage unit 200.

The deviation angle change calculator 213 calculates the change per unit of time in deviation angle ($d\alpha/dt$) by calculating the change per unit of time in the body-lever deflection angle $\alpha$ ($\theta in - \theta fb$ (=$\theta s$)).

The deviation angle change determination component 214 determines whether or not the absolute value ($|d\alpha/dt|$) of the change per unit of time in deviation angle sensed by the deviation angle change calculator 213 is greater than the predetermined value for the change per unit of time in deviation angle stored in the storage unit 200.

The reverse operation detector 221 detects that the operator has operated the joystick lever 24 in a reverse operation. The term "reverse operation" here means that the joystick lever 24 is operated in the opposite direction from the rotation direction of the front frame.

More precisely, the reverse operation detector 221 detects that the joystick lever 24 has been operated in the opposite direction from the rotation direction of the front frame 11 on the basis of the change in deviation angle ($d\alpha/dt$) calculated by the deviation angle change calculator 213 and the frame angular velocity ($d\theta s/dt$) calculated by the frame angular velocity calculator 211.

More specifically, when the value of ($d\theta s/dt$)/($d\alpha/dt$) is negative, it is detected that the joystick lever 24 has been operated in the opposite direction from the rotation direction of the front frame 11.

The neutral position proximity detector 222 detects that the operation spool 71 of the pilot valve 42 has been positioned by operation of the joystick lever 24 within a predetermined angle range (such as ±5°) from the neutral position Np with respect to the operation sleeve 72. More precisely, when the reverse operation detector 221 detects that the joystick lever 24 has been operated in the opposite direction from the rotation direction of the front frame 11, the neutral position proximity detector 222 calculates the deviation angle α on the basis of what is sensed by the first rotational angle sensor 101 and the second rotational angle sensor 102, and determines whether or not the absolute value |α| of the deviation angle is less than a predetermined value for the deviation angle. Then, if the absolute value of the deviation angle is determined to be less than the predetermined value, the neutral position proximity detector 222 detects that the position of the operation spool 71 with respect to the operation sleeve 72 is within a predetermined angle range of the neutral position Np.

That is, the reverse operation detector 221 detects that there has been a reversal, and the neutral position proximity detector 222 detects that the joystick lever 24 is positioned within a predetermined angle range from the neutral position Np of the pilot valve 42. The calculation of the deviation angle α may be performed by the neutral position proximity detector 222, or a value calculated by the deviation angle change calculator 213 or the motor torque deciding component 201 may be acquired, or a deviation angle calculator may be provided separately.

If the absolute value (|dθs/dt|) of the frame angular velocity is determined by the frame angular velocity determination component 212 to be greater than the predetermined value, and the absolute value (|dα/dt|) of the change per unit of time in the deviation angle is determined by the deviation angle change determination component 214 to be greater than the predetermined value, and the reverse operation detector 221 detects that a reverse operation is being performed, and the neutral position proximity detector 222 detects that the position of the operation spool 71 with respect to the operation sleeve 72 is within a predetermined angle range from the neutral position Np, then the anti-reverse force calculator 215 calculates the rotational angular velocity of the joystick lever 24 (dθin/dt), and computes an anti-reverse force (Th) on the basis of this value.

The controller 28 also controls the variable pressure reducer 41 as shown in FIG. 2 on the basis of the rotational angle θin, the rotational angle θfb (=θs), the vehicle speed V. Consequently, the source pressure of the pilot pressure sent to the pilot valve 42 is controlled so that the flow of fluid to the left and right steering cylinders 21 and 22 does not change abruptly.

Also, control of the electric motor 111 and the variable pressure reducer 41 by the controller 28 may be performed by wire or wirelessly.

2. Operation

The operation of the wheel loader 1 in this embodiment will now be described.

First, a general steering operation will be described, after which a reverse operation will be described. After that, control of the force imparting component 27 during a steering operation and a reverse operation will be described.

2-1. Steering Operation

If the joystick lever 24 is in the center position, the operation input shaft 61 is located in a predetermined initial position, and the rotational angle θin produced by the operation input shaft 61 is zero. Also, since the steering angle θs is zero, the feedback input shaft 62 is also located in a predetermined initial position. In this embodiment, as shown in FIG. 7A, the steering angle θs indicates the angle from a state in which the angle along the longitudinal direction with respect to the rear frame 12 is zero. As shown in FIG. 6, the rotational angle θin indicates the rotational angle from the center position of the joystick lever 24. Also, in finding the angular deviation, computation may be performed using a positive angle for rotation to the right and a negative angle for rotation to the left, for example.

At this point, the operation spool 71 is located in the neutral position Np shown in FIG. 4A with respect to the operating sleeve 72. In this case, the pilot pressure in the first pilot chamber 34 and in the second pilot chamber 35 of the steering valve 32 is the same, and the valve body 33 of the steering valve 32 is also in the neutral position Ns. Therefore, no fluid is supplied or discharged to or from the left and right steering cylinders 21 and 22, the steering angle θs is maintained at zero, and the rotational angle θfb (=θs) of the feedback input shaft 62 is also maintained at zero.

Next, the operator exerts an operation force Fin to rotate the joystick lever 24 to the right side from the center position as shown in FIG. 6. When the operating force Fin exceeds F1 of the first spring 64, the operation input shaft 61 rotates to the right the same as the joystick lever 24, and the rotational angle θin of the first operation input shaft 61 is increased. At this point, because of the delay in the response of the left and right steering cylinders 21 and 22, the steering angle θs is still at zero, and the rotational angle θfb (=θs) of the feedback input shaft 62 is also zero. Therefore, the angular deviation (α=θin −θs) between the rotational angle θin and the steering angle θs increases.

The operation spool 71 rotates to the right with respect to the operation sleeve 72 together with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is at or above the counterforce of the spring property S1 of the first spring 64 shown in FIG. 7. Therefore, the operation sleeve 72 does not rotate along with the operating spool 71, and operating the spool 71 rotates to the right with respect to the operation sleeve 72.

Thus, the operating spool 71 rotates to the right with respect to the operation sleeve 72 and moves to the right pilot positions Rp, pilot pressure is supplied to the second pilot port P8, and the pilot pressure is supplied to the second pilot chamber 35.

Thus, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. This gradually increases the steering angle θs, and the front frame 11 is oriented in the right direction with respect to the rear frame 12 (see R in FIG. 2). This change in the steering angle θs is transmitted by the linking mechanism 26 to the feedback input shaft 62, and the feedback input shaft 62 rotates at the rotational angle θs.

When the operator stops the joystick lever 24 at a predetermined rotational angle θ1, the operation input shaft 61 also stops at the rotational angle θ1. On the other hand, since the steering angle θs is gradually increasing, the rotational angle θs of the feedback input shaft 62 also increases. The feedback spool 73 also rotates along with the feedback input shaft 62, and the feedback sleeve 74 linked via the second spring 65 to the feedback spool 73 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. Rotation of the operation sleeve 72 reduces the difference in the rotational angle (deflection angle α) between the operation sleeve 72 and the operation spool 71. When the steering angle θs (the rotational angle θs of the feedback input shaft 62) catches up with the rotational angle 81 (the rotational angle θin of the operation input shaft 61), the angular deviation α drops to zero. At this point, the operation spool 71 of the pilot valve 42 is located in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs is maintained at the rotational angle θ1.

When the joystick lever 24 is thus rotated to the right side and stopped at a predetermined rotational angle θ1, the steering angle θs is also maintained at the same rotational angle θ1. This keeps the front frame 11 oriented in the direction of the rotational angle θ1, to the right with respect to the rear frame 12.

When the operator then returns the joystick lever 24 from the right side position to the center position, the operation input shaft 61 similarly rotates, which reduces the rotational angle θin of the operation input shaft 61. At this point, because of the delay in the response of the left and right steering cylinders 21 and 22, the steering angle θs is still the rotational angle θ1. Therefore, the rotational angle difference α (=θin −θs) decreases from zero and becomes negative. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. This gradually reduces the steering angle θs from the rotational angle θ1. This change in the steering angle θs is transmitted by the linking mechanism 26 to the feedback input shaft 62, and the feedback input shaft 62 rotates at the same change in rotational angle as the change in the steering angle θs.

When the operator stops the joystick lever 24 in its center position, the operation input shaft 61 also stops at its initial position, that is, at a position where the rotational angle θin is zero. S Meanwhile, since the steering angle θs is gradually decreasing from the rotational angle θ1, the difference in rotational angle (angular deviation) a decreases gradually. When the steering angle θs reaches zero, the rotational angle θfb (=θs) of the feedback input shaft 62 also reaches zero, and the rotational angle difference α becomes zero. At this point, the operation spool 71 is disposed in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs goes back to zero and is maintained there. Consequently, the front frame 11 is returned to an orientation along the longitudinal direction with respect to the rear frame 12.

The situation is the same when the joystick lever 24 is rotated to the left side, and will therefore not be described here.

2-2. Reverse Operation

A reverse operation will now be described.

FIGS. 10A to 10D are simplified diagrams illustrating a reverse operation by the operator. The upper side in FIGS. 10A to 10D shows the rotation of the front frame 11 with respect to the rear frame 12, and the lower side shows the rotation of the joystick lever 24.

Figure 10D:
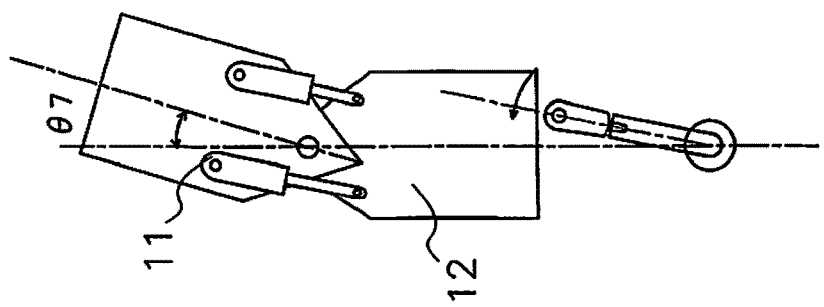
FIGS. 10A to 10D are simplified diagrams illustrating reverse operation.
Figure 10C:
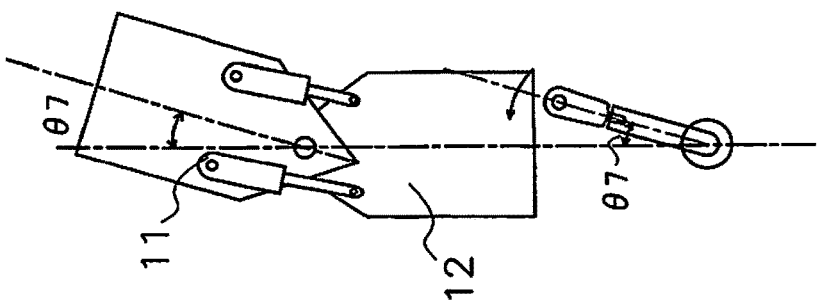
Figure 10B:
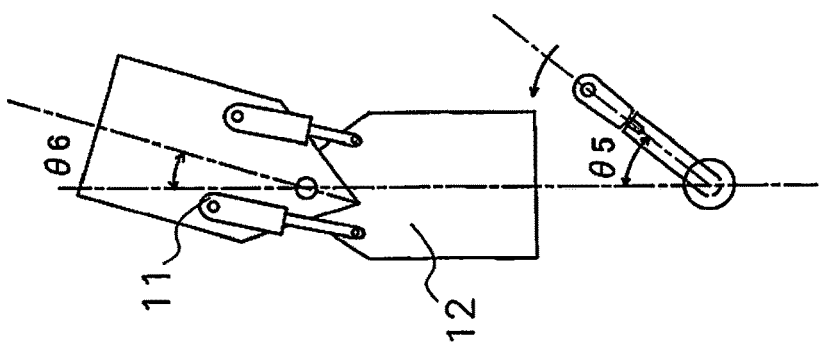
Figure 10A:
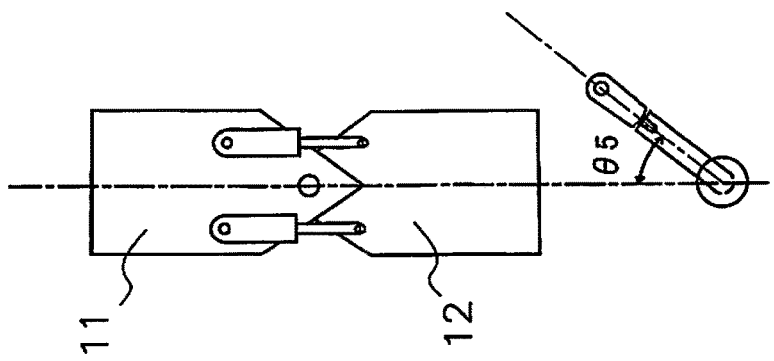

For example, as shown in FIG. 10A, in a state in which the position of the front frame 11 with respect to the rear frame 12 is along the longitudinal direction and the steering angle θs is zero, the joystick lever 24 is rotated to the right by the operator until the rotational angle gin reaches an angle of θ5, and then stops. This rotational angle θ5 corresponds to an example of the target steering angle. The pilot valve 42 is moved by the right rotation of the joystick lever 24 to the right pilot position Rp.

Then, the front frame 11 follows the rotation of the joystick lever 24 and also rotates to the right, and as shown in FIG. 10B, the joystick lever 24 is suddenly rotated to the left at an angle of θ6 (<θ5) before the steering angle θs of the front frame 11 with respect to the rear frame 12 reaches the angle θ5.

Since the joystick lever 24 is suddenly operated, the front frame 11 is rotating to the right relative with respect to the rear frame 12, and the joystick lever 24 is rotated to the left side. Therefore, the steering angle θs and the rotational angle θin coincide at an angle of θ7 in between the angle θ5 and the angle θ7, and the pilot valve 42 goes into the neutral position Np. Since the joystick lever 24 is suddenly rotated to the left, the angle θ7 is about the same value as the angle θ6.

Furthermore, as shown in FIG. 10D, when the joystick lever 24 is rotated to the left beyond the angle θ7, the pilot valve 42 goes into the left pilot position Lp.

As discussed above, even though the front frame 11 is rotating to the right, the pilot valve 42 is suddenly switched from the right pilot position Rp to the left pilot position Lp, so vibration in the body may still occur.

Next, the control of the force imparting component for suppressing vibration of the body will be described.

2-3. Control of Force Imparting Component

Next, the control of the force imparting component 27 in a general steering operation and in a reverse operation will be described.

Figure 11:
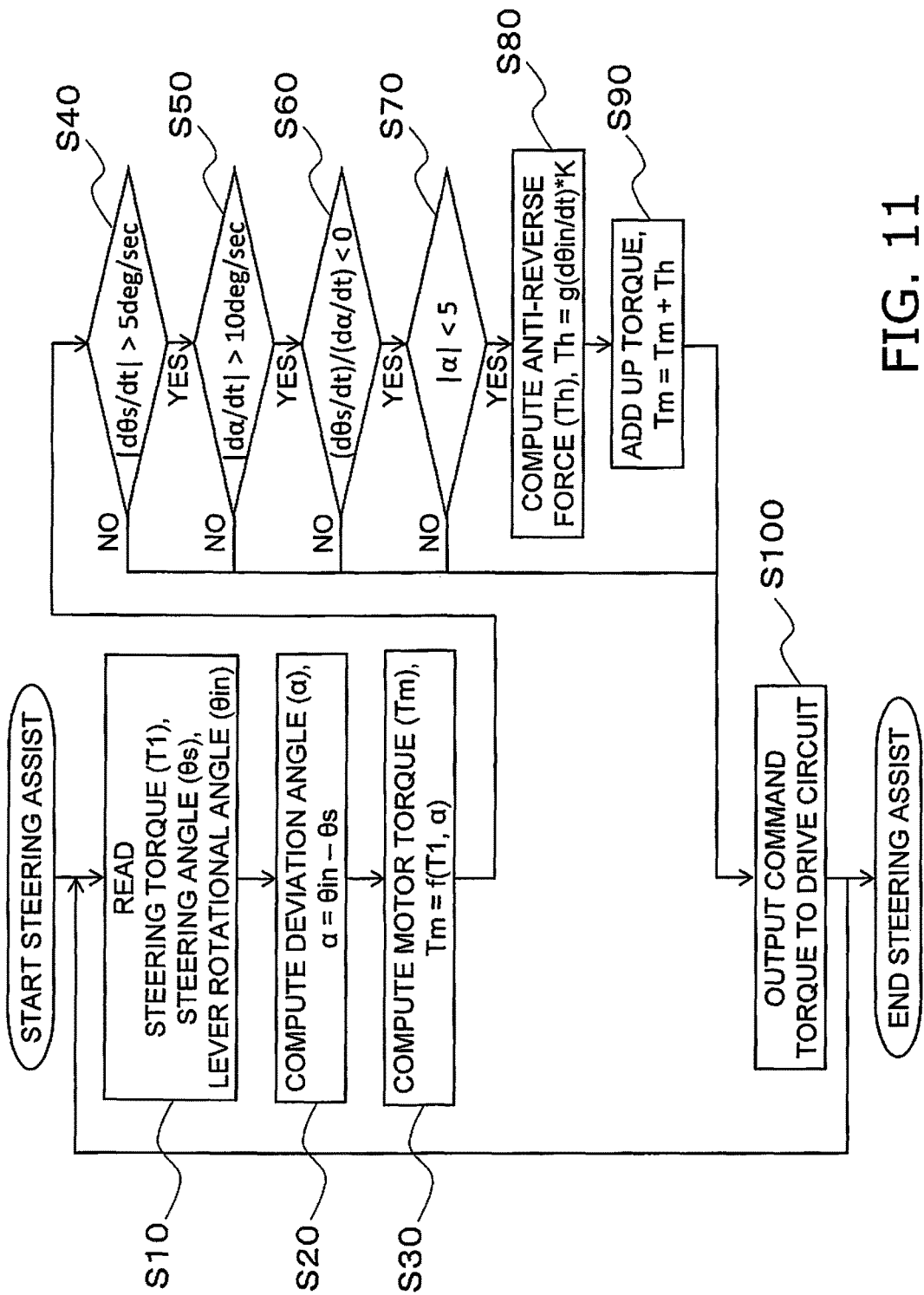
FIG. 11 is a flowchart of the control operation of the force imparting component of the wheel loader in an embodiment pertaining to the present invention.

FIG. 11 is a flowchart of the control operation of the force imparting component in this embodiment.

When operation assist is started, first, in step S10, the controller 28 reads the torque Tl (also referred to as the lever input torque) from the torque sensor 103, reads the rotational angle θin from the first rotational angle sensor 101, and reads the rotational angle θfb (the same as θs, so hereinafter denoted as θs) from the second rotational angle sensor 102.

Next, in step S20, the deviation angle α (θin −θs) is calculated by the motor torque deciding component 201.

Next, in step S30, the motor torque deciding component 201 computes the motor torque (Tm). As shown in FIG. 11, the motor torque (Tm) is calculated using the lever input torque (Tl) and the deviation angle (a) as variables.

The motor torque deciding component 201 decides the motor torque (Tm) on the basis of first assist torque information (assist torque imparted to the lever input torque) and second assist torque information (assist torque imparted to the deviation angle) stored ahead of time in the storage unit 200.

This step S30 will be described in detail.

Figure 12A:
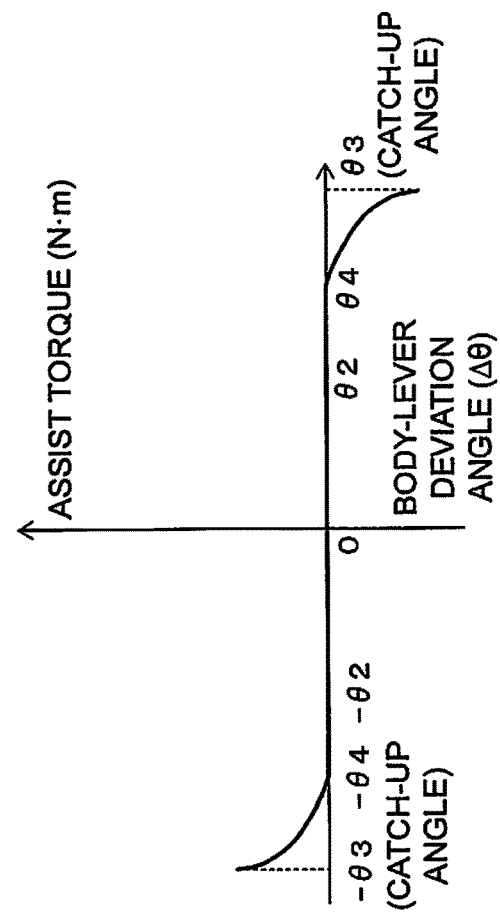
FIG. 12A is a graph of first assist torque information (assist torque imparted to lever input torque) stored in the storage unit in FIG. 9.

FIG. 12A is a graph of first assist torque information stored ahead of time in the storage unit 200. FIG. 12A shows the assist torque imparted to the torque sensed by the torque sensor 103. With the assist torque information shown in FIG.

12A, a positive lever input torque indicates torque produced by the rotation of the joystick lever 24 to the right side, while negative lever input torque indicates torque produced by the rotation of the joystick lever 24 to the left side. Also, a positive assist torque indicates that a force is applied to the right rotation by the force imparting component 27, while a negative assist torque indicates that a force is applied to the left rotation by the force imparting component 27.

The lines L1 and L2 indicate the assist torque imparted to lever input torque.

That is, the line L1 in FIG. 12A indicates that a force is imparted in the right rotation direction to the input shaft 81b when the joystick lever 24 is operated to the tight side, and the line L2 indicates that a force is imparted in the left rotation direction to the input shaft 81b when the joystick lever 24 is operated to the left side. Also, the assist torque is set so that the larger is the absolute value of the torque sensed by the torque sensor 103, the greater will be the assist force applied.

FIG. 12A also shows a dotted line L2' that is symmetrical with the line L2 with respect to the horizontal axis, and as can be seen from a comparison of the dotted L2' and the line L1, the assist force is imparted symmetrically when the joystick lever 24 is operated to the right side and when it is operated to the left side. That is, when the absolute value of the lever input torque is the same in operations to the left and right of the joystick lever 24, the same amount of assist force is imparted.

Figure 12B:
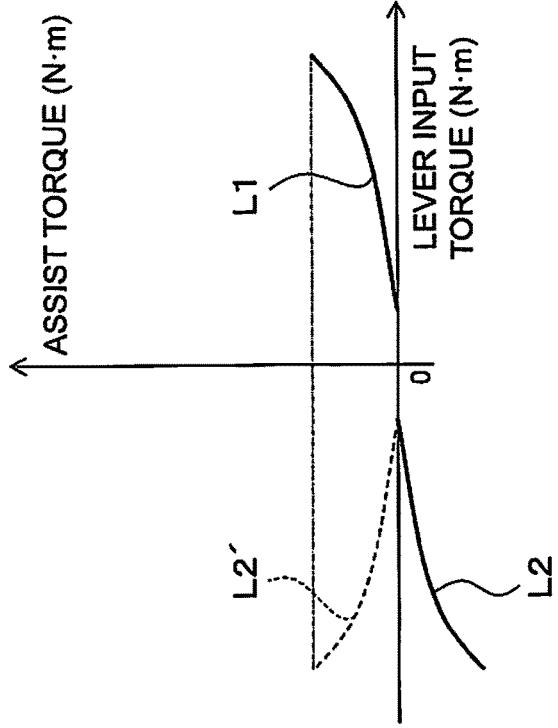
FIG. 12B is a graph of second assist torque information (assist torque imparted to a body-lever deviation angle)

FIG. 12B is a graph of second assist torque information (the assist torque imparted with respect to the body-lever deflection angle ($\alpha$)).

As discussed above, when operating the joystick lever 24 to the right and left, the second center pin 77 strikes the walls 73ae and 73be when the deviation angle $\alpha$ reaches ±θ3 (also referred to as the catch-up angle). If the joystick lever 24 is operated vigorously at this point, the impact can result in an abrupt recoil on the wrist.

To mitigate this abrupt recoil on the wrist, the assist torque information shown in FIG. 12B is stored in the controller 28. FIG. 12B is a graph of assist torque (assist torque information) versus body-lever deviation angle ($\alpha$). With the assist torque information shown in FIG. 12B, counterforce is generated when the deviation angle $\alpha$ reaches an angle of ±θ4, and assist torque is set so that the counterforce will be exponentially larger as the absolute value of the deviation angle becomes larger.

More precisely, the assist torque is set so that when the joystick lever 24 is rotated to the right side and the deviation angle $\alpha$ reaches an angle of +θ4, a force is imparted in the right rotation direction to the input shaft 81b. When the joystick lever 24 is rotated to the left side and the deviation angle $\alpha$ reaches an angle of −θ4, the assist torque is set so that a force is imparted in the left rotation direction to the input shaft 81b. The angle θ4 is set between the angles θ2 and θ3 shown in FIG. 12B. The angle −θ4 is set between −θ2 and −θ3.

Because the counterforce is thus exponentially increased, the operation of the joystick lever 24 becomes heavier as the second center pin 77 approaches the walls 73ae and 73be, so the second center pin 77 will strike the walls 73ae and 73be with less momentum.

When the operator operates the joystick lever 24 and torque is produced at the input shaft 81b, the motor torque deciding component 201 finds the torque on the basis of the first assist torque information shown in FIG. 12A from the torque Tl, and finds the torque on the basis of second assist torque information shown in FIG. 12B from the deviation angle $\alpha$. The motor torque deciding component 201 then combines the two torque values thus found to calculate the motor torque (Tm).

If the following steps S40 to S70 do not apply (discussed in detail below), it is assumed that reverse operation is not applicable, and a command torque is outputted to the drive circuit 204 in step S100 on the basis of the motor torque (Tm) found in step S30. The electric motor 111 is then drive to impart a force to the input shaft 81b on the basis of the command torque from the drive circuit 204, and a force is imparted to the operation of the joystick lever 24.

Figure 13:
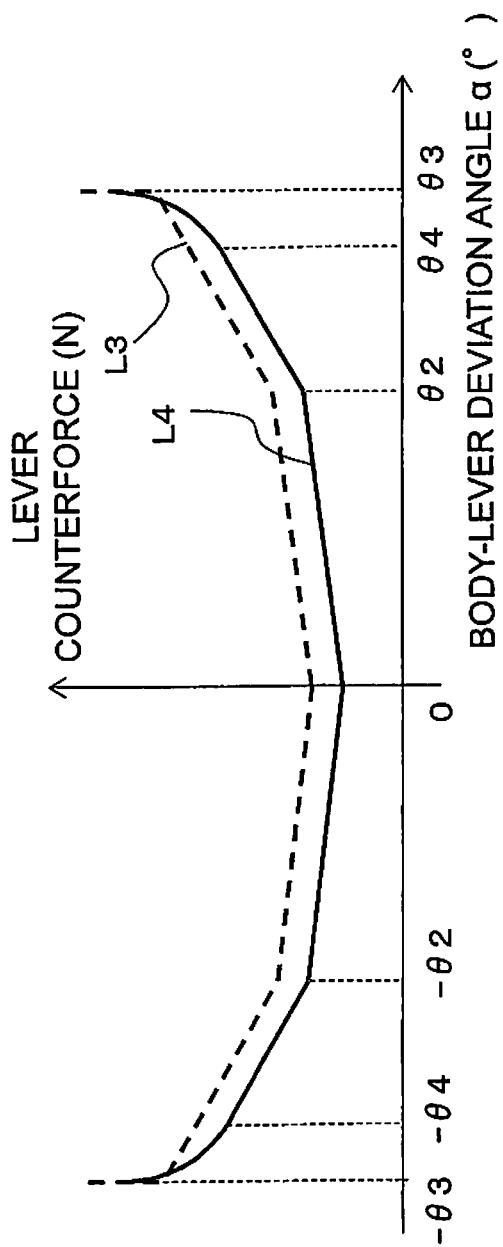
FIG. 13 is a graph of lever counterforce versus body-lever deviation angle when assist torque is and is not imparted on the basis of the first and second assist torque information shown in FIGS. 12A and 12B.

FIG. 13 shows the lever counterforce versus the deviation angle when no force is imparted by the force imparting component 27 (dotted line L3) and when a force is imparted by the force imparting component 27 on the basis of the first assist torque information and the second assist torque information (solid line L4). In FIG. 13, a positive deviation angle $\alpha$ indicates when the rotational angle of the operation input shaft 61 to the right rotation side is greater than that of the feedback input shaft 62, while a negative deviation angle $\alpha$ indicates when the rotational angle of the operation input shaft 61 to the left rotation side is greater than that of the feedback input shaft 62. The dotted line L3 in FIG. 13 indicates the same state as in FIG. 7b.

As shown by L4 in FIG. 13, the lever counterforce can be reduced in operation of the joystick lever 24, and it can be operated with a lighter force. Also, since lever counterforce increases exponentially when the deviation angle $\alpha$ reaches an angle of ±θ4 and the absolute value of the angle becomes greater, it is possible to suppress the recoil to the wrist.

Let us go back to the flowchart. Next, in step S40, frame angular velocity determination component 212 determines whether or not the absolute value of the angular velocity calculated by the frame angular velocity calculator 211 ($|d\theta s/dt|$) is greater than the predetermined value of the frame angular velocity stored in the storage unit 200 (such as 5 deg/sec).

In step S40, if the absolute value of the angular velocity ($|d\theta s/dt|$) is determined to be at or below the predetermined value for frame angular velocity (such as 5 deg/sec), control proceeds to step S100, and the electric motor 111 is driven by the motor torque (Tm) found by the motor torque deciding component 201.

On the other hand, if the absolute value of the angular velocity ($|d\theta s/dt|$) is determined to be greater than the predetermined value for frame angular velocity (such as the 5 deg/sec), control proceeds to step S50.

Then, in step S50, the deviation angle change determination component 214 determines whether or not the absolute value ($|d\alpha/dt|$) of the change per unit of time in the deviation angle calculated by the deviation angle change calculator 213 is greater than the predetermined value (such as 10 deg/sec) for the change per unit of time in the deviation angle stored in the storage unit 200.

In step S50, if the absolute value ($|d\alpha/dt|$) of the change per unit of time in the deviation angle is less than or equal to the predetermined value (such as 10 deg/sec) for the change per unit of time in the deviation angle, control proceeds to step S100, and the electric motor 111 is driven at the motor torque (Tm) found by the motor torque deciding component 201.

On the other hand, if the absolute value ($|d\alpha/dt|$) of the change per unit of time in the deviation angle is determined to be greater than the predetermined value (such as 10 deg/sec) for the change per unit of time in the deviation angle, control proceeds to step S60.

Then, in step S60, the reverse operation detector 221 determines whether or not the value of (dθs/dt)/(dα/dt) is negative from the frame angular velocity (dθs/dt) calculated by the frame angular velocity calculator 211 and the change per unit time in the deviation angle (dα/dt) calculated by the deviation angle change calculator 213. Consequently, it is detected that the joystick lever 24 has been operated in the opposite direction from the rotation direction of the front frame 11.

In step S60, if it is determined that the value of (dθs/dt)/(dα/dt) is not negative, control proceeds to step S100 and the electric motor 111 is driven at the motor torque (Tm) found by the motor torque deciding component 201.

On the other hand, if it is determined in step S60 that the value of (dθs/dt)/(dα/dt) is negative, control proceeds to step S70.

Then, in step S70, the neutral position proximity detector 222 determines whether or not the absolute value |α| of the deviation angle is less than a predetermined value for the deviation angle (such as 5°). Consequently, it is determined whether or not the position of the operation spool 71 with respect to the operation sleeve 72 is within a predetermined range from the neutral position Np.

If it is determined in step S70 that the absolute value |α| of the deviation angle is at or above a predetermined value for the deviation angle (such as 5°), control proceeds to step S100 and the electric motor 111 is driven at the motor torque (Tm) found by the motor torque deciding component 201.

On the other hand, if it is determined in step S70 that the absolute value |α| of the deviation angle is less than the predetermined value of the deviation angle (such as 5°), control proceeds to step S80.

Then, in step S80, an anti-reverse force (Th) is calculated by the anti-reverse force calculator 215. This anti-reverse force (Th) is computed, for example, by using dθin/dt as a variable to calculate the rotational angular velocity (dθin/dt) of the joystick lever 24. For instance, the anti-reverse force can be set higher the higher is the rotational angular velocity of the joystick lever 24.

Figure 14:
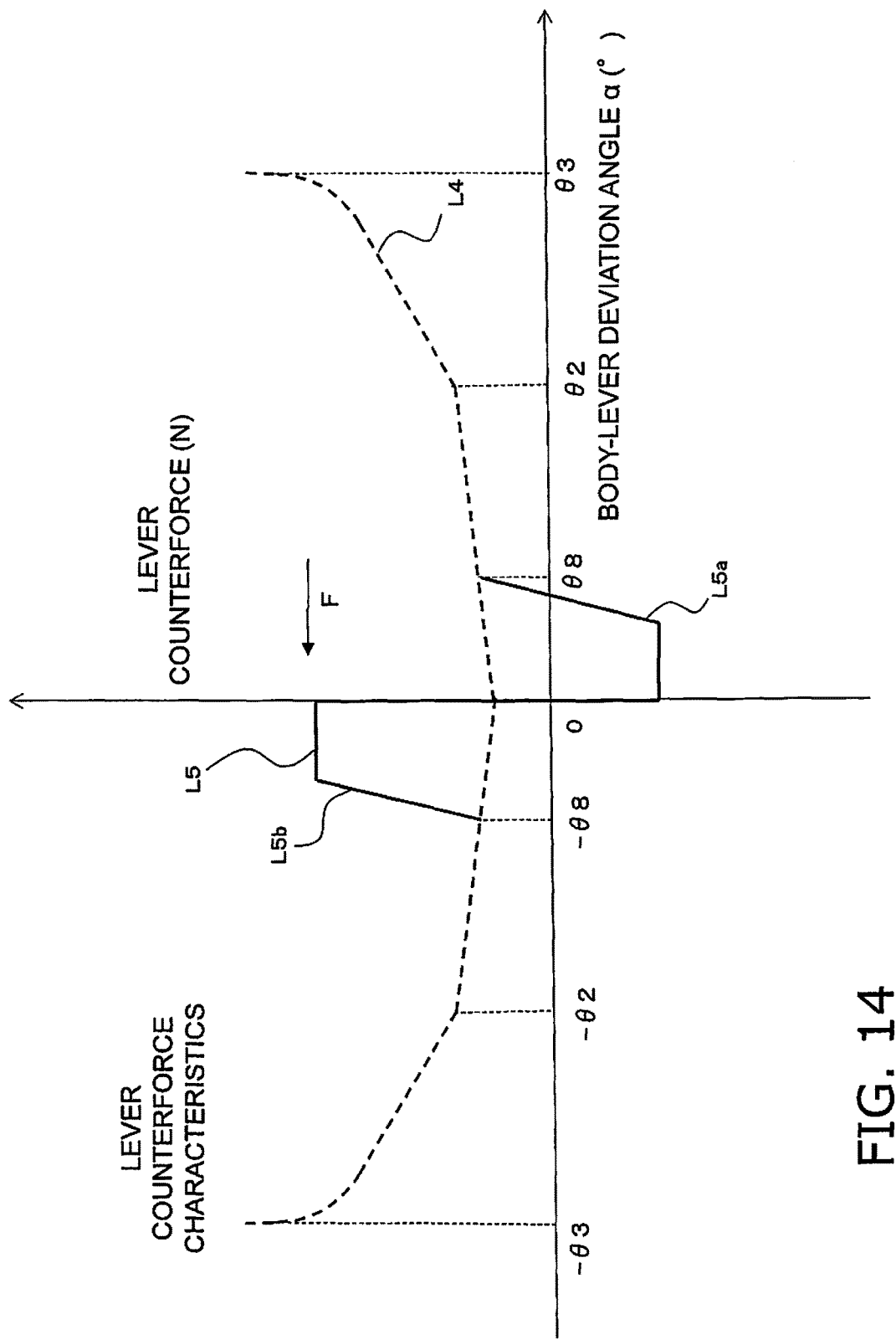
FIG. 14 is a graph of lever counterforce versus body-lever deviation angle when an anti-reverse counterforce is imparted during reverse operation of the wheel loader in this embodiment.

FIG. 14 shows an example of the lever counterforce versus the body-lever deflection angle α when reverse operation to the left (the arrow F) is performed and an anti-reverse force is imparted. The dotted line L4 in FIG. 14 indicates the lever counterforce characteristics, and is the same as the solid line L4 in FIG. 13.

In FIG. 14, a body-lever deflection angle α (°) with a positive value indicates when the joystick lever 24 is rotated to the right side from the neutral position Np. A positive lever counterforce in a body-lever deflection angle α (°) with a positive value indicates a counterforce to the left (a force that attempts to return from the right to the neutral position Np). A negative lever counterforce in a body-lever deflection angle α (°) with a positive value indicates a counterforce to the right.

A body-lever deflection angle α (°) with a negative value indicates when the joystick lever 24 is rotated to the left side from the neutral position Np. A positive lever counterforce in a body-lever deflection angle α (°) with a negative value indicates a counterforce to the right (a force that attempts to return from the left to the neutral position Np). A negative lever counterforce in a body-lever deflection angle α (°) with a negative value indicates a counterforce to the left.

As shown in FIGS. 10A to 10D, if the joystick lever 24 is abruptly operated to the left (see arrow F in FIG. 14) during rotation of the front frame 11 to the right, and the deviation angle α reaches an angle of θ8 (in the above example, θ8=5°), the controller 28 controls the force imparting component 27 so that a lever counterforce to the right will be exerted as indicated by the line L5 (see L5a). Because the counterforce is to the right, the result is a shape that protrudes toward the negative side from the dotted line L4. Consequently, since a lever counterforce is imparted so that the neutral position Np will not be exceeded, it is less likely that there will be a sudden switch between left and right positions with respect to the pilot valve 42, and less likely that vibration will be generated in the work vehicle.

The force imparting component 27 imparts counterforce toward the right until the joystick lever 24 goes past the neutral position Np (deviation angle=0°) and the body-lever deflection angle α reaches the angle −θ8 (see Lb). Since the counterforce is to the right, L5b has a shape that protrudes toward the positive side from the dotted line L4. Consequently, a counterforce can be generated against the operation of the joystick lever 24 so as to prevent the joystick lever 24 from going past the neutral position Np and prevent the difference between the joystick lever 24 and the neutral position Np from increasing in the opposite direction from the rotation direction of the frame. The only time a counterforce is thus imparted up to an angle of θ8 to −θ8 when steps S40, S50, and S60 are satisfied. The same applies when reverse operation to the right is performed.

Next, in step S90, the torque adder 203 finds the motor torque (Tm) by adding the anti-reverse force (Th) to the motor torque (Tm) found by the motor torque deciding component 201.

Then, in step S100, a command torque is outputted to the drive circuit 204 on the basis of the summed motor torque (Tm). The electric motor 111 is then driven on the basis of the command torque from the drive circuit 204 to impart a force to the input shaft 81b and impart a force to the operation of the joystick lever 24.

Consequently, when the absolute value of the angular velocity of the front frame 11 is greater than a predetermined value (such as 5 deg/sec), and the absolute value of the change per unit of time in deviation angle is greater than a predetermined value (such as 10 deg/sec), a counterforce is imparted to the operation of the joystick lever 24 by the force imparting component 27 over a predetermined angle range (such as 5°) from the neutral position Np when the joystick lever 24 is operated in the opposite direction from the rotation direction of the front frame 11.

Also, once the deviation angle reaches ±θ4, the lever counterforce increases, making it less likely that there will be a recoil to the wrist at the catch-up angle.

3. Features, Etc.

(1)

The wheel loader 1 in this embodiment (an example of a work vehicle) is an articulated wheel loader in which the front frame 11 and the rear frame 12 are linked, and comprises the joystick lever 24, the steering cylinders 21 and 22 (an example of a hydraulic actuator), the pilot valve 42 (an example of a control valve), the first rotational angle sensor 101 (an example of a displacement sensor), the second rotational angle sensor 102 (an example of an angle sensor), and the controller 28. The joystick lever 24 is operated by the operator and allows a target steering angle to be set. The steering cylinders 21 and 22 are driven hydraulically, changing the actual steering angle θs of the front frame 11 with respect to the rear frame 12 according the operation of the joystick lever 24. The pilot valve 42 controls the flow of fluid supplied to the steering cylinders 21 and 22 so that there will be no deviation between the target steering angle θin and the actual steering angle θs, and goes into the neutral position Np in a state in which the target steering angle θin matches the actual steering angle θs. The force imparting component 27 imparts an assist force or a counterforce to the operation of the joystick lever 24. The first rotational angle sensor 101 senses the rotational angle of the joystick lever 24 (an example of displacement). The second rotational angle sensor 102 senses the actual steering angle θs. The controller 28 controls the force imparting component 27 so that a counterforce will be imparted to the operation of the joystick lever 24 when it is detected that the joystick lever 24 has been operated in the opposite direction from the rotation direction of the front frame 11, on the basis of what is sensed by the first rotational angle sensor 101 and the second rotational angle sensor 102.

Thus counterforce is imparted to the operation of the joystick lever 24 when reverse operation is detected.

Therefore, the tactile sensation of the joystick lever 24 becomes heavier in reverse operation, the sudden switching of the left and right positions of the pilot valve 42 is slowed, and vibration is less likely to occur in the body.

(2)

With the wheel loader 1 in this embodiment (an example of a work vehicle), the controller 28 controls the force imparting component 27 so that a counterforce is imparted to the operation of the joystick lever 24 before reaching the neutral position Np.

Thus, when reverse operation is detected, a counterforce is imparted to the operation of the joystick lever 24 before reaching the neutral position Np of the pilot valve 42. That is, counterforce is generated against the operation of the joystick lever 24 to prevent going past the neutral position Np of the pilot valve 42 during reverse operation.

Therefore, the tactile sensation of the joystick lever 24 becomes heavier approaching the neutral position Np in reverse operation, the sudden switching of the left and right positions of the pilot valve 42 is slowed, and vibration is less likely to occur in the body.

(3)

With the wheel loader 1 in this embodiment (an example of a work vehicle), the controller 28 actuates the force imparting component 27 so that counterforce will be imparted to the operation of the joystick lever 24 within ±5° from the neutral position Np (an example of a predetermined angle range).

Consequently, the joystick lever 24 is operated in the opposite direction from the rotation direction of the front frame 11, and counterforce is imparted to the operation of the joystick lever 24 over a predetermined angle range from the neutral position Np. That is, counterforce is generated against the operation of the joystick lever 24 to prevent going past the neutral position Np in reverse operation and prevent this difference from increasing in the opposite direction from the rotation direction of the front frame 11.

(4)

With the wheel loader 1 in this embodiment (an example of a work vehicle), the controller 28 further includes the frame angular velocity determination component 212. As shown in FIG. 11, the frame angular velocity determination component 212 determines whether or not the absolute value ($|d\theta/dt|$) of the frame angular velocity when the front frame 11 is rotated relative to the rear frame 12, which is found on the basis of what is sensed by the second rotational angle sensor 102, is greater than 5 deg/sec (an example of a first predetermined value). The controller 28 actuates the force imparting component 27 so that a counterforce will be generated when the frame angular velocity determination component 212 determines the absolute value ($|d\theta/dt|$) of the frame angular velocity to be greater than 5 deg/sec.

Consequently, when the absolute value ($|d\theta/dt|$) of the frame angular velocity in reverse operation is greater than 5 deg/sec, a counterforce can be generated against the operation of the joystick lever 24 so as to prevent going past the neutral position Np of the pilot valve 42. For example, when the absolute value ($|d\theta/dt|$) of the frame angular velocity in reverse operation is no more than 5 deg/sec, there is little vibration even if there is a sudden switch in the left and right positions of the pilot valve 42 and vibration does occur. Therefore, it is possible to generate a counterforce only when necessary by providing 5 deg/sec as an example of a first predetermined value.

(5)

With the wheel loader 1 in this embodiment (an example of a work vehicle), the controller 28 further has the deviation angle change calculator 213 and the deviation angle change determination component 214. As shown in FIG. 11, the deviation angle change calculator 213 calculates the change per unit of time in the deviation angle ($d\alpha/dt$), which is the difference between the rotational angle θin of the joystick lever 24 and the actual steering angle θin, on the basis of what is sensed by the first rotational angle sensor 101 and the second rotational angle sensor 102. The deviation angle change determination component 214 determines whether or not the absolute value ($|d\alpha/dt|$) of the change per unit of time in the deviation angle calculated by the deviation angle change calculator 213 is greater than 10 deg/sec (an example of a second predetermined value). The controller 28 actuates the force imparting component 27 to generate a counterforce when it is determined by the deviation angle change determination component 214 that the absolute value ($|d\alpha/dt|$) of the change per unit of time in the deviation angle is greater than 10 deg/sec.

Consequently, when the absolute value ($|d\alpha/dt|$) of the change per unit of time in the difference in rotational angles between the joystick lever 24 and the front frame 11 in reverse operation is greater than 10 deg/sec (an example of a second predetermined value), a counterforce can be generated against the operation of the joystick lever 24 to prevent going past the neutral position Np of the pilot valve 42. For example, in reverse operation, if the absolute value ($|d\alpha/dt|$) of the change per unit of time in the difference between the rotational angle of the joystick lever 24 and the rotational angle θin of the front frame 11 is no more than 10 deg/sec, there will be little vibration even if there is a sudden switch in the left and right positions of the pilot valve 42 and vibration does occur. Therefore, it is possible to generate a counterforce only when necessary by providing 10 deg/sec as an example of a second predetermined value.

(6)

With the wheel loader 1 in this embodiment (an example of a work vehicle), the controller 28 has the deviation angle change calculator 213 and the reverse operation detector 221. The deviation angle change calculator 213 calculates the change per unit of time in the deviation angle ($d\alpha/dt$), which is the difference between the rotational angle θin of the joystick lever 24 and the actual steering angle θin, on the basis of what is sensed by the first rotational angle sensor 101 (an example of a displacement sensor) and the second rotational angle sensor 102 (an example of an angle sensor). The reverse operation detector 221 detects that the joystick lever 24 has been operated in the opposite direction from the rotation direction of the front frame 11 on the basis of the frame angular velocity ($dos/dt$) when the front frame 11 rotates with respect to the rear frame 12, which is found on the basis of what is sensed by the second rotational angle sensor 102, and the change per unit of time in the deviation angle (dα/dt) calculated by the deviation angle change calculator 213.

This makes it possible to detect that the joystick lever has been operated in the opposite direction from the rotation direction of the front frame.

(7)

With the wheel loader 1 in this embodiment (an example of a work vehicle), the controller 28 has the neutral position proximity detector 222 (an example of a deviation angle determination component). As shown in FIG. 11, the neutral position proximity detector 222 determines whether or not the absolute value of the deviation angle α, which is the difference between the rotational angle gin of the joystick lever 24 and the actual steering angle θs, is less than 5° (an example of a third predetermined value) on the basis of what is sensed by the first rotational angle sensor 101 and the second rotational angle sensor 102. The controller 28 actuates the force imparting component 27 to generate a counterforce when the neutral position proximity detector 222 determines the absolute value of the deviation angle α to be less than 5°.

Thus, when the absolute value of the deviation angle α is less than 5° (an example of a third predetermined value), it can be determined that the joystick lever 24 is being operated to a position close to the neutral position Np of the pilot valve 42 (within a predetermined angle range (±5°)). Consequently, a counterforce can be imparted with to the operation of the joystick lever 24 when the joystick lever 24 reaches the vicinity of the neutral position Np in reverse operation.

(8)

The wheel loader 1 in this embodiment (an example of a work vehicle) further comprises the torque sensor 103. The torque sensor 103 senses the torque (Tl) produced by the operation of the joystick lever 24. The controller 28 actuates the force imparting component 27 to impart a counterforce having a magnitude based on the torque (Tl) sensed by the torque sensor 103.

Consequently, a force can be imparted according to the torque (Tl) the operator has applied to the joystick lever 24. For example, the amount of force imparted can be controlled so that the assist force imparted by the force imparting component 27 is high when the torque applied by the operator to the joystick lever 24 is high, and the assist force is low when the torque is low.

(9)

With the wheel loader 1 in this embodiment (an example of a work vehicle), the pilot valve 42 (an example of a control valve) has the operation input shaft 61 (an example of a first input member) and the feedback input shaft 62 (an example of a second input member). The operation input shaft 61 is linked to the joystick lever 24 and is displaced according to the rotational angle θin of the joystick lever 24 (an example of an operation amount). The feedback input shaft 62 is displaced according to the actual steering angle θs. The pilot valve 42 controls the flow of fluid supplied to the steering cylinders 21 and 22 according to the difference α between the rotational angle of the operation input shaft 61 and the rotational angle θfb (=θs) of the feedback input shaft 62. The neutral position Np is the position where the rotational angle θin of the operation input shaft 61 matches the rotational angle θfb of the feedback input shaft 62 (=θs).

Consequently, after the joystick lever 24 is operated, the steering angle θs changes to follow the joystick lever 24, and the pilot valve 42 is in the neutral position Np when the rotational angle θin of the joystick lever 24 matches the steering angle θs.

(10)

The wheel loader 1 in this embodiment (an example of a work vehicle) further comprises the steering valve 32. The steering valve 32 adjusts the flow of fluid supplied to the steering cylinders 21 and 22 on the basis of the pilot pressure inputted from the pilot valve 42 (an example of a control valve). The pilot valve 42 controls the flow of the fluid supplied from the steering valve 32 to the steering cylinders 21 and 22 by adjusting the pilot pressure.

Consequently, the pilot pressure is adjusted by operation by the operator, the amount of fluid supplied from the steering valve 32 to the steering cylinders 21 and 22 is controlled, and the steering angle θs of the front frame 11 with respect to the front frame 11 changes.

(11)

The wheel loader 1 in this embodiment (an example of a work vehicle) further comprises the link 25. The link 25 links the joystick lever 24 to the pilot valve 42. The force imparting component 27 has the electric motor 111 and the worm gear 112 (an example of a transmission mechanism). The electric motor 111 generates an assist force or a counterforce. The worm gear 112 (an example of a transmission mechanism) transmits the assist force or counterforce produced by the electric motor 111 to the link.

Consequently, the force of the electric motor 111 can be transmitted to the link 25 that links the joystick lever 24 to the pilot valve 42, and the force required to operate the joystick lever 24 can be changed.

(12)

The method for controlling the wheel loader 1 (an example of a work vehicle) in this embodiment is a method for controlling an articulated type of wheel loader in which the front frame 11 is linked to the rear frame 12, the wheel loader 1 having the joystick lever 24 linked to the pilot valve 42 (an example of a control valve) that controls the supply of fluid to the steering cylinders 21 and 22 (an example of a hydraulic actuator) that change the steering angle θs of the front frame 11 with respect to the rear frame 12, said method comprising a step S60 (an example of a reverse operation detection step) and a step S100 (an example of force imparting step). Step S60 (an example of a reverse operation detection step) involves detecting that the joystick lever 24 has been operated in the opposite direction from the rotation direction of the front frame 11. Step S100 (an example of a force imparting step) involves imparting a counterforce to the operation of the joystick lever when reverse operation has been detected in the step S60 (an example of reverse operation detection step).

When reverse operation is thus detected, counterforce is imparted to the operation of the joystick lever 24.

Therefore, the tactile sensation of the joystick lever 24 becomes heavier in reverse operation, the sudden switching of the left and right positions of the pilot valve 42 is slowed, vibration is less likely to occur in the body.

Other Embodiments

An embodiment of the present invention was described above, but the invention is not limited to or by the above embodiment, and various modifications are possible without departing from the gist of the present invention.

(A)

In the above embodiment, the anti-reverse force (Th) calculated by the anti-reverse force calculator 215 was added to the motor torque (Tm) decided by the motor torque deciding component 201, but the motor torque deciding component 201 need not be provided, and the electric motor 111 may impart only the anti-reverse force (Th) to the input shaft 81b.

(B)

In the above embodiment, the motor torque deciding component 201 calculated the assist torque on the basis of the first assist torque information shown in FIG. 12A and the second assist torque information shown in FIG. 12B, and used that assist torque as the motor torque (Tm), but the assist torque may also be changed on the basis of the vehicle speed sensed by the vehicle speed sensor 105.

Figure 15:
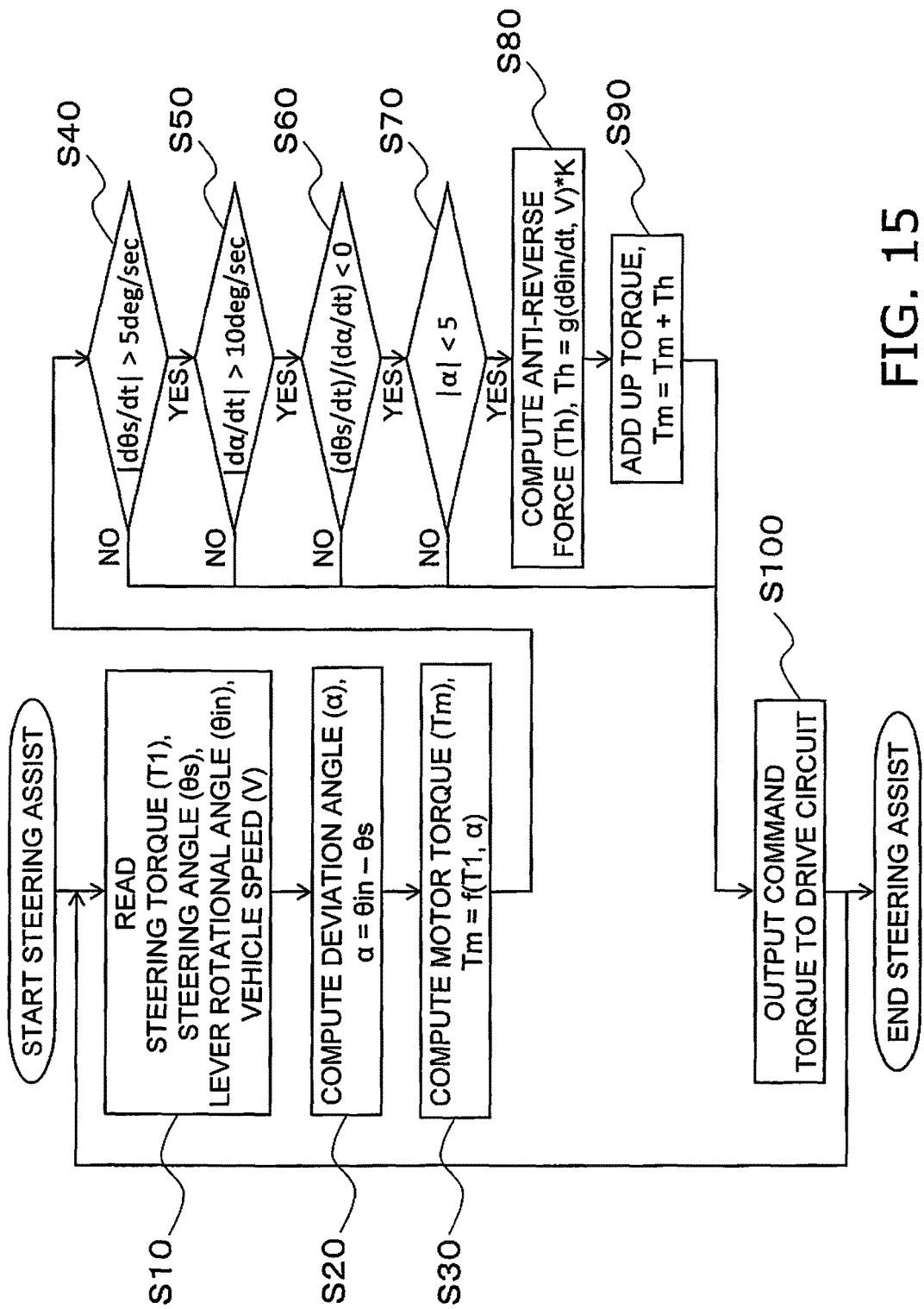
FIG. 15 is a flowchart of a modification example of the control operation of the force imparting component of the wheel loader in this embodiment.

In this case, as shown in the flowchart in FIG. 15, in step S10 the controller 28 reads the torque Tl, the rotational angle θin, and the rotational angle θfb, and also reads the vehicle speed (V) from the vehicle speed sensor 105.

Then, in step S80, when the anti-reverse force calculator 215 calculates the anti-reverse force (Th), the anti-reverse force is calculated by also taking into account the vehicle speed V, as shown in the formula in FIG. 15 (Th=g (gθin/dt, V)*K). For instance, the function g may be set so that the higher is the vehicle speed, the more the anti-reverse force is increased. This makes vibration less likely when reverse operation is performed during high-speed movement, and improves high-speed stability.

(C)

In the above embodiment, in step S60 the reverse operation detector 221 detected reverse operation by using the frame angular velocity (dθs/dt) and the change per unit of time in the deviation angle (dα/dt), but reverse operation may also be detected on the basis of the direction of the angular velocity of the joystick lever 24 (dθin/dt) and the direction of the frame angular velocity (dθs/dt). In this case, the reverse operation detector 221 detects that reverse operation is being performed when the frame angular velocity (dθs/dt) and the angular velocity (dθin/dt) of the joystick lever 24, found on the basis of what is sensed by the first rotational angle sensor 101, are reversed ((dθin/dt)/(dθs/dt) <0).

(D)

In the above embodiment, in step S10 the controller 28 read the rotational angle θfb (=θs) from the second rotational angle sensor 102, but this is not the only option, and the controller 28 may also read the steering angle θs sensed by the steering angle sensor 104, or the steering angle θs may be calculated by reading the values sensed by cylinder stroke sensors 106 and 107.

(E)

In the above embodiment, the joystick lever 24 and the pilot valve 42 were mechanically linked by the link 25, but this is not the only option. The joystick lever 24 and the pilot valve need not be mechanically linked, and the pilot valve may be operated by transmitting the operation of the joystick lever 24 to the pilot valve electrically.

Figure 16:
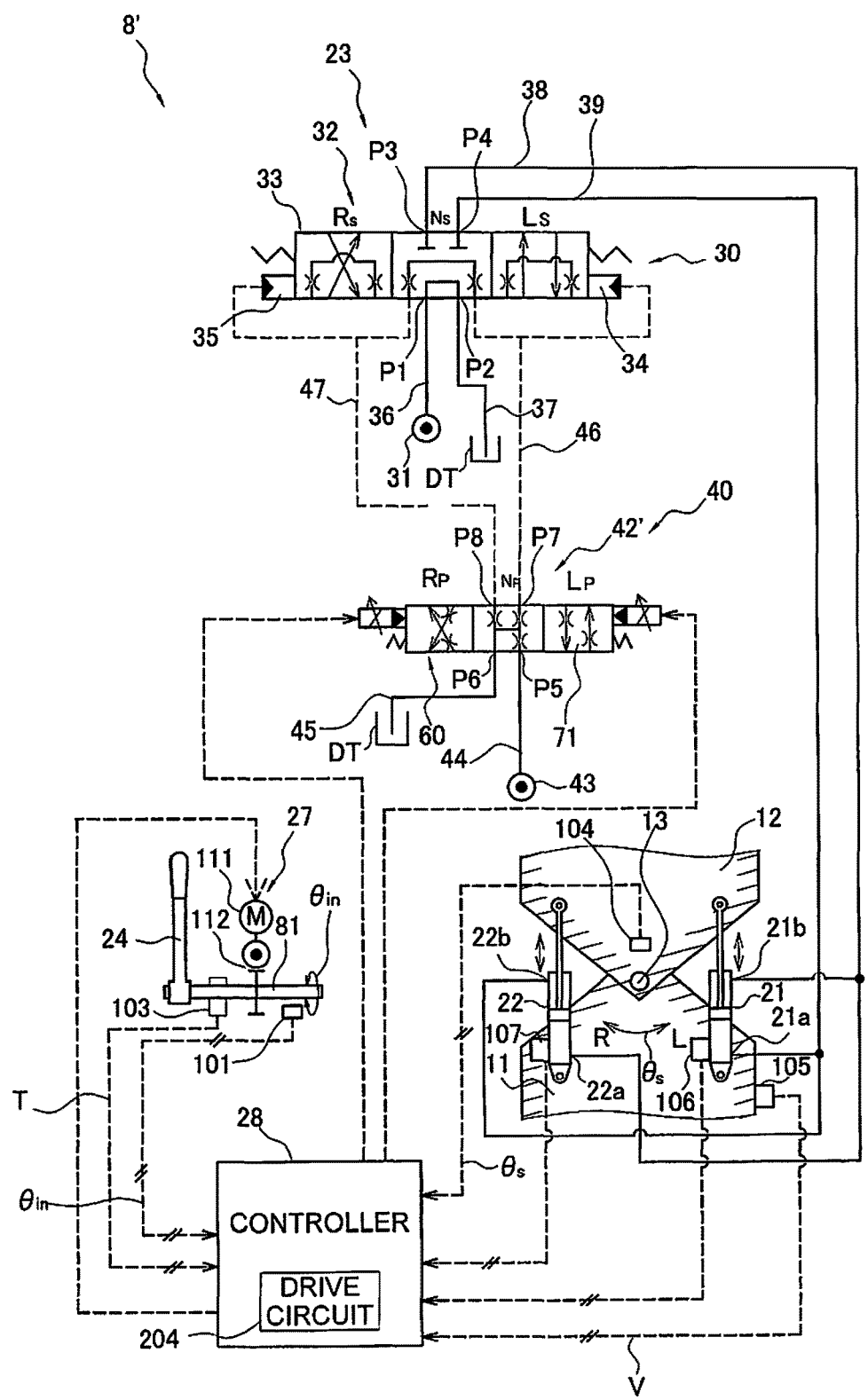
FIG. 16 is a configuration diagram of a steering operation device in a modification example of an embodiment pertaining to the present invention.

FIG. 16 is a diagram of a steering operation device 8' as an example of a configuration for electrically transmitting the operation of the joystick lever 24 to a pilot valve 42'. The pilot valve 42' shown in FIG. 16 is not a rotary type as in the above embodiment, but rather a spool type. The pilot valve 42' has a valve body component 60 that includes a spool 71' and a sleeve (not shown). The spool 71' is able to move between a neutral position Np, a left pilot position Lp, and a right pilot position Rp according to a signal from the controller 28, and using the sleeve as a reference.

With the configuration shown in FIG. 16, for example, the universal joint 83 shown in FIG. 5 is not provided. The joystick lever 24 is connected to the steering operation shaft 81. The steering operation shaft 81 is not linked to the pilot valve. As in the above embodiment, the force imparting component 27 imparts an assist force or a counterforce to the steering operation shaft 81. The first rotational angle sensor 101 senses the rotational angle θin of the steering operation shaft 81 and transmits it to the controller 28.

Also, with the steering operation unit 8', the pilot valve 42' is a spool type. The linking mechanism 26 for linking the pilot valve and the front frame 11 as shown in FIG. 5 is not provided. The steering angle sensor 104 senses the steering angle θs of the front frame 11 with respect to the rear frame 12 and sends it to the controller 28.

The controller 28 sends a command to the pilot valve 42' and controls the movement of the spool 71' of the pilot valve 42' on the basis of the received information about the rotational angle θin and the steering angle θs. The movement of the spool 71' changes the pilot pressure supplied from the pilot valve 42' to the steering valve 32, and changes the amount of fluid supplied from the steering valve 32 to the steering cylinders 21 and 22. Consequently, a steering operation is performed. At this point, the controller 28 may control the pilot pressure so that the difference between θin and θs is reduced, thereby making the rotational angle θin match the steering angle θs.

Figure 17:
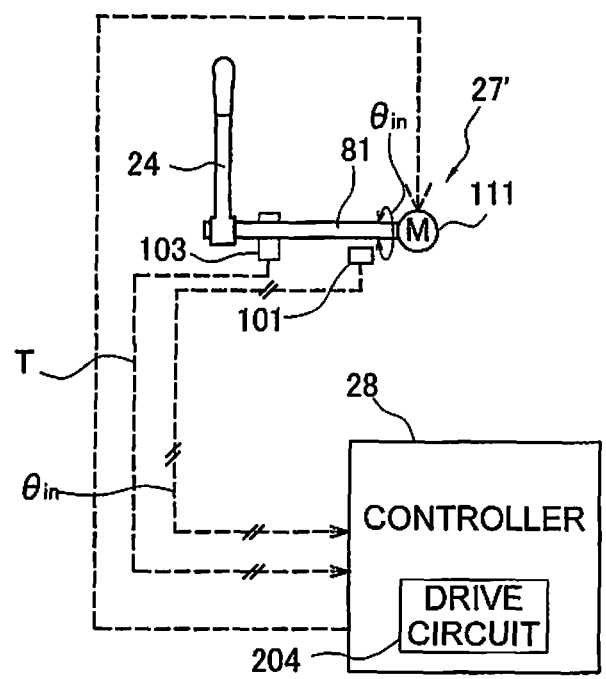
FIG. 17 is a configuration diagram of a force imparting component in a modification example of an embodiment pertaining to the present invention.

With the steering operation device 8', the force of the electric motor 111 is transmitted by the worm gear 112 to the steering operation shaft 81, but as with the force imparting component 27' shown in FIG. 17, the rotational shaft of the electric motor 111 may be connected directly to the steering operation shaft 81, without going through a reduction gear such as the worm gear 112.

With the steering apparatus 8 shown in FIG. 5, the joystick lever 24 itself is able to rotate around the shaft in the up and down direction, to the inside or the outside of the operator's seat. The configuration may be such that the joystick lever 24 itself is able to rotate horizontally around the shaft, to the inside or the outside of the operator's seat. In other words, the configuration may be such that the pilot valve 42' is actuated on the basis of operation of the joystick lever 24, and the force from the force imparting component 27 can be transmitted to the joystick lever 24.

Electrical transmission may be performed either by wire or wirelessly.

(F)

In the above embodiment, two springs, namely the first spring 64 and the second spring 65, were provided, but the second spring 65 need not be provided. In this case, for example, the part between the feedback spool 73 and the feedback sleeve 74 may be fixed.

(G)

In the above embodiment, the configuration was such that the amount of fluid supplied from the steering valve 32 to the steering cylinders 21 and 22 was controlled according to the pilot pressure inputted from the pilot valve 42 (an example of a control valve), but configuration may be such that the fluid from the pilot valve 42 is supplied directly to the steering cylinders 21 and 22.

(H)

In the above embodiment, a force was generated by the electric motor 111, but instead of an electric motor, a hydraulic motor or the like may be used. In other words, it should be an actuator or the like with which the force to be imparted can be generated.

(I)

In the above embodiment, the drive circuit 204 was included in the controller 28, but it need not be included in the controller 28, and only the drive circuit 204 may be mounted by itself. Furthermore, the drive circuit 204 may be mounted to an electric motor.

(J)

In the above embodiment, the wheel loader 1 was given as an example of a work vehicle, but a wheel loader is not the only option, and may instead be an articulated dump truck, motor grader, or the like, so long as it is an articulated work vehicle.

INDUSTRIAL APPLICABILITY

The work vehicle and method for controlling a work vehicle of the present invention have the effect of minimizing vibration in reverse operation, and are useful in a wheel loader or the like.

The invention claimed is:

1. A work vehicle, the work vehicle being articulated with a front frame and a rear frame linked to the front frame, the work vehicle comprising:
a joystick lever configured to be operated by an operator to allow a target steering angle to be set;
a hydraulic actuator configured to be driven hydraulically to change an actual steering angle of the front frame with respect to the rear frame according to an operation of the joystick lever;
a control valve configured to control flow of fluid supplied to the hydraulic actuator so that there is no deviation between the target steering angle and the actual steering angle, and to be in a neutral position in a state in which the target steering angle matches the actual steering angle;
a force imparting component configured to impart an assist force or a counterforce to the operation of the joystick lever;
a displacement sensor configured to sense displacement of the joystick lever;
an angle sensor configured to sense the actual steering angle; and
a controller configured to control the force imparting component so that a counterforce is imparted to the operation of the joystick lever when it is detected that the joystick lever has been operated in an opposite direction from a rotation direction of the front frame based on detections of the displacement sensor and the angle sensor.

2. The work vehicle according to claim 1, wherein the controller is further configured to control the force imparting component so that a counterforce is imparted to the operation of the joystick lever before reaching the neutral position.

3. The work vehicle according to claim 2, wherein the controller is further configured to actuate the force imparting component so that a counterforce is imparted to the operation of the joystick lever within a predetermined angle range from the neutral position.

4. The work vehicle according to claim 1, wherein the controller includes a frame angular velocity determination component configured to determine whether or not a frame angular velocity of the front frame with respect to the rear frame determined based on detection of the angle sensor is greater than a first predetermined value, and
the controller actuates the force imparting component so that the counterforce is generated when the frame angular velocity determination component has determined that the frame angular velocity is greater than the first predetermined value.

5. The work vehicle according to claim 1, wherein the controller includes
a deviation angle change calculator configured to calculate change per unit time in the deviation angle, which is difference between the rotational angle of the joystick lever and the actual steering angle, based on detections of the displacement sensor and the angle sensor, and
a deviation angle change determination configured to determine whether an absolute value of the change per unit time in the deviation angle calculated by the deviation angle change calculator is greater than a second predetermined value, and
the controller is further configured to control the force imparting component so that the counterforce is generated when the deviation angle change determination component determines that the absolute value of the change per unit time in the deviation angle is greater than the second predetermined value.

6. The work vehicle according to claim 1, wherein the controller includes
a deviation angle change calculator configured to calculate change per unit time in a deviation angle, which is difference between the rotational angle of the joystick lever and the actual steering angle, based on detections of the displacement sensor and the angle sensor, and
a reverse operation detector configured to detect that the joystick lever has been operated in an opposite direction from the rotation direction of the front frame based on a frame angular velocity when the front frame rotates with respect to the rear frame found based on the basis of detection of the angle sensor, and the change per unit time in the deviation angle calculated by the deviation angle change calculator.

7. The work vehicle according to claim 1, wherein the controller includes a reverse operation detector configured to detect that the joystick lever has been operated in the opposite direction from the rotation direction of the front frame, based on a fact that a direction of an angular velocity of the joystick lever, which is found based on detection of the displacement sensor, is opposite of a direction of a frame angular velocity when the front frame rotates with respect to the rear frame, which is found based on detection of the angle sensor.

8. The work vehicle according to claim 3, wherein the controller includes a deviation angle determination component configured to determine whether or not an absolute value of a deviation angle, which is a difference between the rotational angle of the joystick lever and the actual steering angle, is less than a third predetermined value, and
the controller is further configured to actuate the force imparting component so that the counterforce is generated when the deviation angle determination component determines that the absolute value of the deviation angle is less than the third predetermined value.

9. The work vehicle according to claim 1, further comprising:
a torque sensor configured to sense torque produced by the operation of the joystick lever, the controller being further configured to actuate the force imparting component so as to impart the counterforce in a magnitude based on the torque sensed by the torque sensor.

10. The work vehicle according to claim 1, wherein
the controller includes
a first input member linked to the joystick lever and configured to be displaced according to an amount of operation of the joystick lever, and
a second input member configured to be displaced according to the actual steering angle,
the controller is further configured to control flow of fluid supplied to the hydraulic actuator according to a difference between an amount of displacement of the first input member and an amount of displacement of the second input member, and
the neutral position is a position at which the amount of displacement of the first input member matches the amount of displacement of the second input member.

11. The work vehicle according to claim 1, further comprising:
a steering valve configured to adjust flow of fluid supplied to the hydraulic actuator based on a pilot pressure inputted from the control valve,
the control valve being further configured to control the flow of fluid supplied from the steering valve to the hydraulic actuator by adjusting the pilot pressure.

12. The work vehicle according to claim 1, further comprising:
a link linking the joystick lever to the control valve,
the force imparting component including
an electric motor configured to generate the assist force or the counterforce, and
a transmission mechanism transmitting the assist force or the counterforce produced by the electric motor to the link.

13. The work vehicle according to claim 1, further comprising:
a speed sensor configured to sense the speed of the work vehicle,
the controller being further configured to control the force imparting component so as to change the counterforce that is imparted to the operation of the joystick lever according to speed sensed by the speed sensor.

14. A method for controlling an articulated work vehicle including a front frame, a rear frame linked to the front frame, and a joystick lever linked to a control valve configured to control supply of fluid to a hydraulic actuator configured to change a steering angle of the front frame with respect to the rear frame, the method comprising:
detecting that a reverse operation of the joystick lever has been executed in which the joystick is operated in an opposite direction from a rotation direction of the front frame; and
imparting a counterforce to the operation of the joystick lever when the reverse operation has been detected.

* * * * *